United States Patent [19]

McQuinn et al.

[11] 4,018,316
[45] Apr. 19, 1977

[54] ENGINE AND TRANSMISSION POWER TRAIN

[75] Inventors: Ted M. McQuinn, Carmel; Richard B. Anderson, Indianapolis, both of Ind.

[73] Assignee: General Motors Corporation, Detroit, Mich.

[22] Filed: Mar. 7, 1974

[21] Appl. No.: 448,991

[52] U.S. Cl. ............................. 192/3.3; 192/.075; 192/113 B; 60/39.16; 60/39.24; 74/645
[51] Int. Cl.$^2$ .................. F16H 39/00; F16H 47/08
[58] Field of Search ........................... 192/3.29, 3.3

[56] References Cited
UNITED STATES PATENTS

| | | | |
|---|---|---|---|
| 2,728,427 | 12/1955 | Lucia | 192/3.3 |
| 2,747,430 | 5/1956 | Forster et al. | 192/3.3 |
| 2,750,018 | 6/1956 | Dundore | 192/3.3 |
| 3,068,974 | 12/1962 | Jandasek | 192/3.3 |
| 3,719,093 | 3/1973 | Edmunds | 192/3.3 |

*Primary Examiner*—Benjamin W. Wyche
*Attorney, Agent, or Firm*—A. M. Heiter

[57] ABSTRACT

The power train has a manual throttle controlled gas turbine engine having a high no load idle speed and a transmission having a low capacity fluid coupling and a variable capacity slipping friction clutch connected in parallel to the input of a multiratio gear unit for driving a vehicle. During engine idle with the vehicle stationary, when the gear unit is in neutral, the fluid coupling is unloaded to permit the engine to operate and drive the accessories at a high no load idle speed. When the gear unit is placed in a drive ratio, the fluid coupling is stalled loading the engine and reducing the no load idle speed to a regulated lower drive starting idle speed range, to reduce the inertia energy level for smooth drive starting clutch engagement and to maintain the engine output speed in a proper vehicle accessory operating idle speed range. When the throttle is increased from idle to initiate vehicle drive, in a minimal low throttle range, the engine torque and speed will increase in accordance with the fluid coupling stall torque characteristics, in a large middle throttle range, the torque capacity of the slipping friction clutch will increase proportional to the compressor discharge pressure of the as turbine engine and the engine output torque will increase with reduced engine output speed to provide normal drive initiating torque requirements and in a small maximum throttle range, full capacity non-slip engagement of the friction clutch will provide increased engine torque at zero engine output speed to maximum torque to meet maximum drive initiating torque requirements.

13 Claims, 10 Drawing Figures

ENGINE AND TRANSMISSION POWER TRAIN

This invention relates to a gas turbine engine and transmission power train and particularly a fluid coupling and slipping friction clutch drive.

This power train has an engine that will function at stall and preferably provide increasing engine stall torque with increasing fuel feed. The transmission has a fluid drive for controlling engine idle speed at a proper low value for initiating drive of a standing load or vehicle. The engine, when the manual fuel feed is at idle setting and operating at no load, only driving engine and vehicle accessories but disconnected from the load or vehicle drive, will run at a high engine idle speed not suitable or smooth initiation of starting drive because of the high engine inertia level. The transmission has a fluid drive and a slipping clutch in parallel drive arrangement. The fluid drive on a shift to a drive initiating position controls the fluid drive to load the engine in an amount substantially equal to the available engine output, the engine output less the output driven accessory load, at a low starting idle speed range in which the engine has a low inertia energy level suitable for smooth drive initiating clutch engagement and a proper minimum accessory drive speed. The amount of the fluid drive load on the engine increases more rapidly with increasing speed than the engine output for auto regulation of engine speed in the low starting idle speed range notwithstanding variation in the output driven accessory load. Then when the fuel feed is advanced sufficiently so there is not any overlap with this idle speed regulating control a mid range fuel feed control gradually increases starting clutch apply pressure proportional to torque demand, compressor discharge pressure, to gradually increase the drive by the slipping starting clutch to lock up engagement to initiate drive. The slipping starting clutch engagement reduces engine speed, so some engine inertia energy is available to drive the load and the differential clutch speed or clutch slip is reduced both by reducing engine speed and increasing output speed for smooth lock up of the starting clutch. It is also preferred that engine torque increase as engine speed is reduced. At or near full fuel feed maximum clutch pressure provides lock up of the starting clutch which may stall the engine power turbine if maximum torque is required to start the load.

The two shaft gas turbine engine has a gas generator, including a compressor and a manual fuel feed system respectively supplying compressed air and fuel to the combustion apparatus to generate the gas flow delivered to the gas coupled compressor turbine and power turbine. The compressor turbine drives the compressor shaft and compressor and the power turbine drives the engine output shaft. Such engines characteristically provide increasing output horsepower and torque with increasing compressor speed and fuel feed and increasing horsepower and decreasing torque with increasing output speed. The engine preferably also has variable power transfer means to variably control the power and torque transferred between the power turbine and compressor turbine to provide relative torque, speed and power characteristics of the power turbine and compressor turbine for improved performance and efficiency. The variable power transfer means when disengaged provides two shaft gas coupled gas turbine engine operating characteristics and gradually with increased power transfer changes the engine operating characteristics to single shaft gas turbine engine operating characteristics at lock up of the power transfer means. The specific variable power transfer slipping clutch between the power turbine and compressor turbine is controlled to vary power transfer to provide more constant gas temperature operation for optimum performance and efficiency. These two shaft engines having a manually set idle fuel feed without idle speed control by an output govenor when idling under no load conditions or accessory load conditions characteristically provide a high output idle speed and a low torque output shaft drive merely providing accessory load torque requirements. Such high idle speed gas turbine engine drive normally has a high inertia energy level and causes drive line shock when a conventional transmission having a main clutch or a fluid drive is operated to establish the first ratio drive to initiate driving a vehicle.

The engine power turbine is connected by a high reduction ratio drive, about 10:1, to the output shaft and by a similar reduction ratio, preferably slightly lower, about 7:1, to the power transfer clutch. The power transfer clutch is connected to the compressor turbine shaft by a speed increasing ratio drive about 8:1, so the compressor speed exceeds the power turbine speed at lock up by about 15%.

The transmission has an input member driven by the engine output shaft and driving in parallel a low capacity fluid coupling and a full capacity friction starting clutch controlled for slipping variable capacity drive and lock up drive. The fluid coupling and friction clutch jointly drive an intermediate shaft which is connected by a multiratio gear unit to drive the transmission output or load shaft. The fluid coupling has a low torque and horsepower capacity relative to maximum engine torque and horsepower, about 10% of maximum engine torque and horsepower at a normal 10% slip drive. The gear unit has a positive neutral to unload the fluid coupling turbine to completely unload the engine except for the engine driven accessory load to provide the normal high speed low accessory torque engine idle operation for optimum economy and high idle speed drive of the engine and vehicle accessories. When the gear unit is shifted to drive with the engine fuel control at idle and the vehicle standing, the first ratio drive of the gear unit is engaged to hold the fluid coupling turbine stationary to stall the fluid coupling and load the engine to reduce engine idle speed to a proper drive starting low idle speed and reduce the engine inertia level for shockless or smooth drive starting clutch engagement. The stalled fluid coupling also controls or regulates the engine low idle speed within a narrow range during vehicle accessory load variations to maintain the low idle speed within the proper operating speed range for vehicle accessories driven by the engine output shaft and to maintain substantial constant speed and inertia energy level for smooth starting clutch engagement. To effect this low idle speed control, the fluid coupling stall torque increases quite steeply relative to the decreasing engine idle torque in the low idle speed range. At the selected mean low idle speed, the sum of the coupling stall torque at that speed plus the normal vehicle accessory load equals the engine idle torque. When accessory torque load is increased, reducing speed decreases coupling stall torque and increases engine idle torque to provide the increased accessory torque with minimal speed change. When accessory torque load is reduced, increasing speed increases coupling stall torque and reduces engine idle torque. Thus the system is auto regulating to provide a substantially constant regulated or governed low idle speed.

During this idling operation, it is preferred that a positive minimum clutch apply pressure just hold the clutch plates in contact so that moving or rotating friction conditions and the dynamic coefficient of friction is established so there is not a significant coefficient of friction change and delay while slack is taken up in the clutch assembly through filling the clutch piston and oil is squeezed from between the clutch plates. This positive minimum clutch apply pressure and force is so small that the torque transmitted is insignificant and was omitted in the above discussion of idling operation.

When the fuel feed is advanced from idle in a small initial portion of the fuel feed range, the clutch pressure remains at zero or the preferred minimum pressure and there is a small engine torque and power increase with a small increase of engine speed on the coupling stall torque and horsepower curves to load the engine and transmission, but normally the standing vehicle would not move. This control phase is essentially for tolerance requirements so the controlled low idle speed range of operation does not overlap the variable capacity starting clutch engaging range of operation and provides a smooth torque increase for minimum torque downhill starts.

The variable capacity starting clutch engaging range of operation occurs in a large middle range of fuel feed advance. Advancing the fuel feed in the middle range proportionally increases the engine compressor discharge pressure which provides a torque demand signal indicative of a later rise of engine torque. Thus a faster manual fuel feed advance will begin the initial fuel feed controlled increase of clutch pressure and capacity at a lower actual engine torque and speed. The compressor discharge pressure, as the fuel feed is advanced through the middle range, increases clutch pressure and slipping clutch torque transmitting capacity from minimum zero or a positive minimum, progressively to full pressure and capacity capable of transmitting full engine torque and power. In a normal mid range load start, as the fuel feed is advanced the slipping clutch gradually transmits more torque first decreasing engine speed and then increasing engine speed, as the vehicle begins to move, until the clutch differential speed reaches zero at lock up. During clutch engagement, the torque transmitted by the fluid coupling progressively diminishes to zero just before lock up. The reduction of engine speed is increased with higher vehicle loads and higher rates of fuel feed increase for increased acceleration. During a maximum load start, an unusual starting condition, the engine power turbine and load shaft may be stalled to provide substantially maximum engine torque. Thus the engine output speed is normally merely reduced below the proper range of engine idle speeds for vehicle accessory drive during the brief moment, a few seconds, required to engage the clutch and initiate vehicle movement or possibly stalled for a shorter period. The controlled amount of engine inertia energy available at the controlled low idle starting speed is reduced in an amount proportional to the speed reduction during clutch engagement and the amount of engine inertia energy made available by the reduction of engine inertia contributes to the drive start to move the vehicle. In a maximum load start, the engine power turbine may be stalled providing maximum torque thus stopping the vehicle accessory drive, but this will only occur in the very brief moment of clutch engagement in the high fuel feed range providing lock up engagement of the clutch and substantially maximum engine torque until the vehicle moves. Thus the vehicle drive starting control by the compressor discharge pressure responsive to fuel feed is only used in initiating drive of a standing or slowly moving vehicle and thus this control is deactivated above the low speed where this starting slipping clutch control is not needed and to assure a direct lock up between the vehicle wheels and the engine to utilize the desirable engine braking characteristics of the gas turbine engine.

The low capacity fluid coupling has a large ratio of torus outer diameter to toric section diameter, i.e., about 7:1 to 20:1 so an efficient low capacity fluid coupling may have a conventional full capacity clutch, preferably the same size as other full capacity transmission clutches, located concentrically within the fluid coupling. This arrangement meets the normal vehicle space requirements and provides a compact arrangement of the coupling and full capacity slipping duty friction clutch. The arrangement also has a single high volume fluid flow used for clutch cooling, fluid coupling operating toric chamber supply and through flow for cooling and to provide a clutch release pressure acting on the piston.

These and other features of the invention will be more apparent from the following detailed description and drawings of a preferred embodiment.

FIG. 1 shows the arrangement of the drawing parts of FIG. 2.

FIGS. 2a and 2b when arranged as shown in FIG. 1, schematically show the engine transmission power train and control system.

DETAILED DESCRIPTION:

ENGINE

Figure 1:
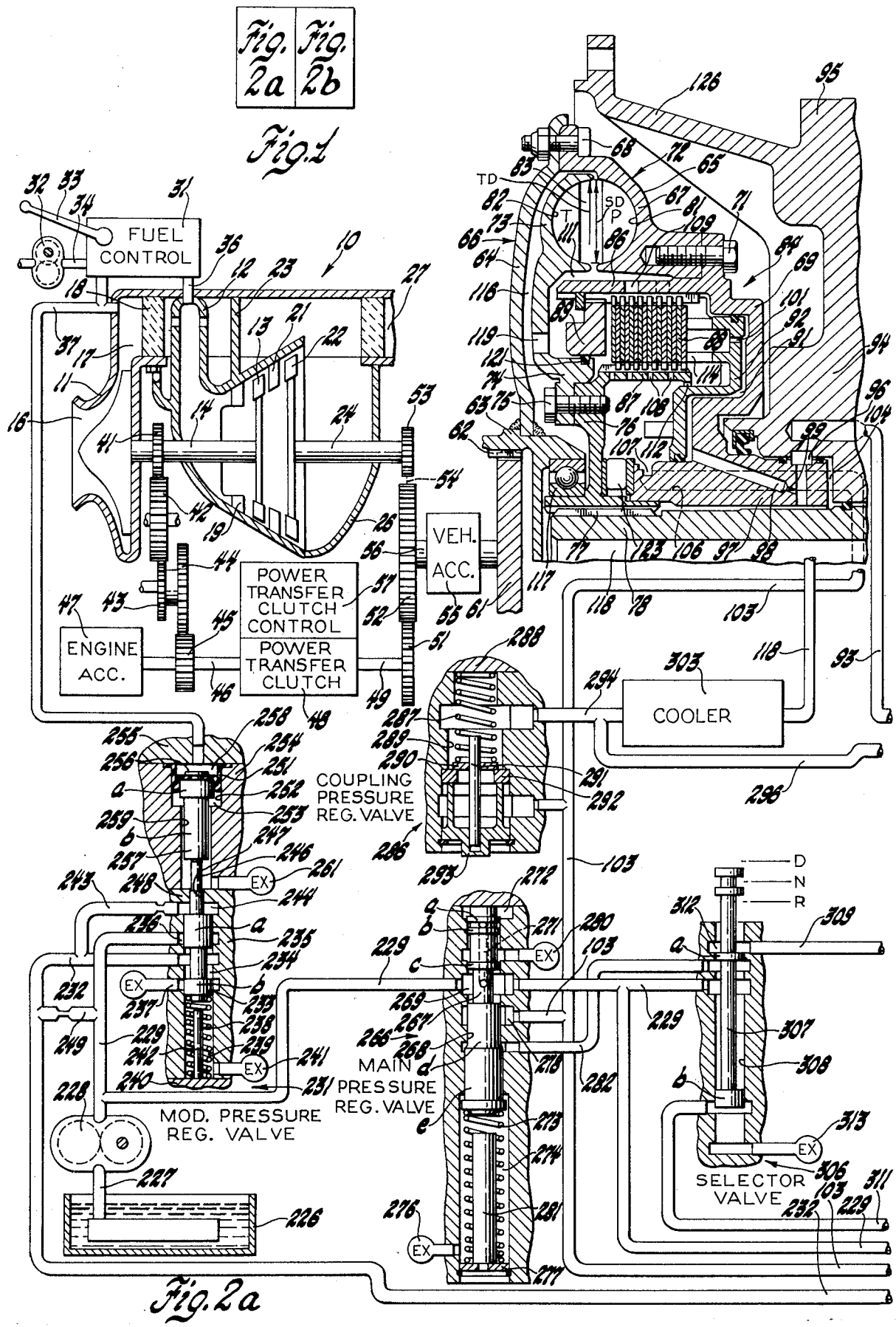
Figure 2:
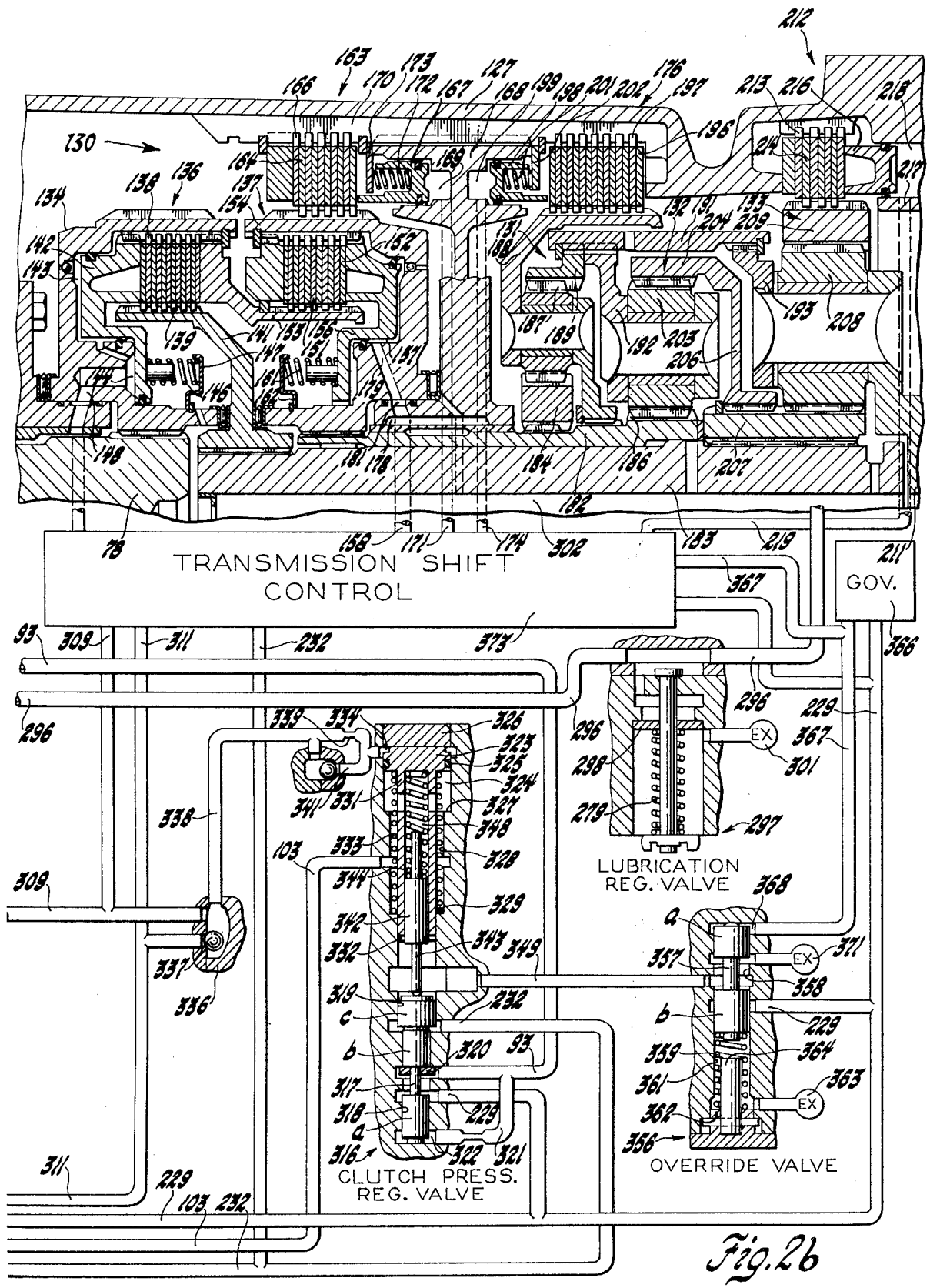

Referring first to FIG. 2a, the engine is preferably a gas turbine engine 10 of the two shaft power transfer clutch regenerative type as shown for example in the E. E. Flanigan et al U.S. Pat. No. 3,237,404 patented Mar. 1, 1966. The engine has a compressor 11, combustion apparatus 12 and a first or compressor turbine 13 coupled to the compressor by shaft 14. These structures are the basic elements of the gas generator. The ambient air enters the entrance 16 of the compressor, is compressed and discharged from the compressor to the compressor discharge chamber 17 and then flows through the matrix 18 of the radial flow rotary regenerator into the combustion apparatus 12. The gas flow from the combustion apparatus 12 passes through stator vanes 19, the turbine 13 and stator vanes 21 to drive the power turbine 22. The exhaust from the power turbine passes radially through the matrix 18 to the rear of the bulkhead 23 which divides the matrix into compressed air flow zone and exhaust gas flow zone. The power turbine 22 drives the power turbine shaft 24. The engine is enclosed in a housing 26 to confine the motor fluid or generative gas flow from the gas generator through the stators and turbines and to control the flow of exhaust through the matrix to the exhaust passage 27.

The primary control of the engine is of fuel flow to the combustion apparatus. Any appropriate fuel feed control 31 supplied with fuel by a fuel pump 32 may be employed. Suitable fuel controls are well known and including this invention in an engine does not require any additions to the fuel control. Ordinarily the vehicle operator controls the engine by hand lever or foot pedal such as a throttle lever 33 connected to the fuel control. The fuel supplied by the pump 32 is delivered through fuel line 34. The fuel control conventionally returns excess fuel to the pump inlet and delivers the engine fuel requirements through fuel feed line 36 to the combustion apparatus. Such fuel controls ordinarily include one or more fuel regulating or metering valves which are variable throttling valves and a head regulating valve which controls a metering pressure differential. They may include relief valves and various limiters or safety valves. The fuel flow may be regulated to prevent overspeed, overtemperature, or lean blowout but ordinarily is primarily responsive to some suitable parameter as compressor discharge pressure. As indicated here, the compressor discharge pressure line 37 is connected to the fuel control. Such controls may include metering means responsive to an engine speed for overspeed protection but this invention eliminates the need for governor idle speed fuel feed control and normal range fuel feed speed control.

In this power plant comprising any suitable free turbine engine, any convenient fuel supply and control means therefor, the fuel pump 32 and other engine auxiliaries or accessories 47 are driven by the gas generator. For this purpose, the gas generator or compressor shaft 14 is connected by a series of gears, the driving gear 41 on shaft 14, idler gear 42, coaxial united gears 43 and 44 and the driven gear 45 on the compressor power transfer shaft and engine auxilliary and accessory drive shaft 46 which drives the engine accessories 47 which include the fuel pump 32. These accessories include the engine control and lubrication pumps and the transmission pump 228, described below. The compressor power transfer shaft 46 is also connected by the multiplate variable slip power transfer clutch 48 to the load power transfer shaft 49 which is drive connected by gear 51 fixed on shaft 49 and meshing with output gear 52.

The power turbine shaft 24 has a high maximum speed, e.g., 32,000 rpm and drive gear 53 driving the output gear 52 and output shaft 56, e.g., at a maximum speed of 2,800 rpm, through a conventional high reduction speed ratio, i.e., 10:1 to 12:1, gear set 54, not shown, but diagrammatically indicated. The output gear 52 and power transfer clutch gear 51 provide a small speed increase so the net reduction speed ratio between the power turbine shaft and power transfer clutch load shaft 49 is about 7:1 so e.g., when the power turbine shaft 24 runs at 32,000 rpm, the clutch load shaft runs 4,500 rpm. The compressor shaft 14 is connected by a speed reduction ratio gearing, 41, 42, 43, 44 and 45 having a ratio of about 8:1 so at maximum power turbine speed, e.g., 32,000 with the power transfer clutch locked up and rotating, e.g., at 4,500 rpm, the compressor shaft rotates at 37,000 rpm. Thus compressor speed is about 15% greater than power turbine speed.

Figure 3:
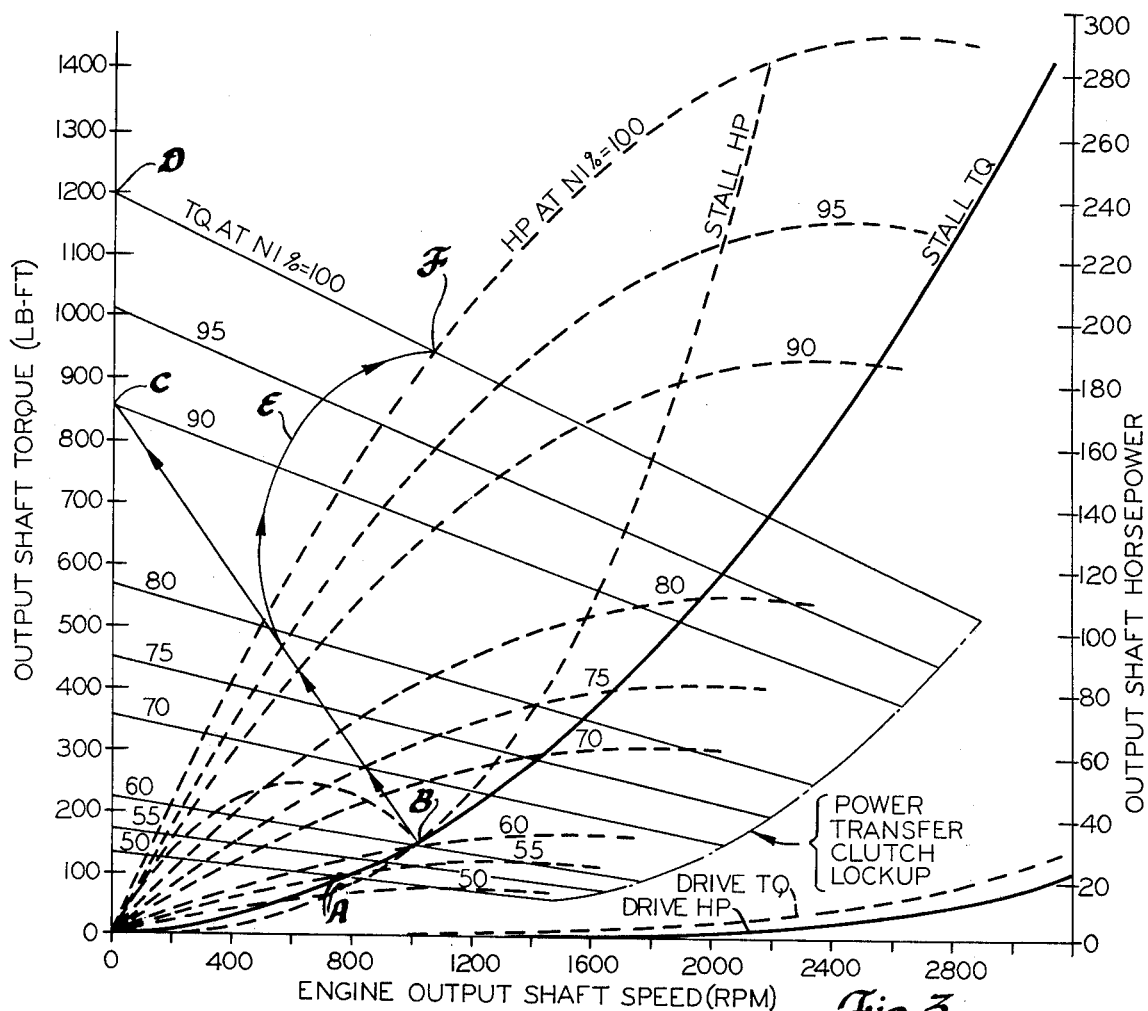
FIG. 3 is a plot of engine, coupling and transmission torque curves and power curves relative to engine speed.

The power transfer clutch control 57 controls the power transfer clutch 48 so the engine has torque and power output characteristics as shown by the curves in FIG. 3 and is constructed and operates in a known manner as shown in the Flanigan et al U.S. Pat. No. 3,237,404, patented Mar. 1, 1966. Such power and torque output characteristic curves are typical for two shaft gas coupled gas turbine engines. The power transfer clutch increases these output characteristics and at lock up at maximum speed provides single shaft gas turbine engine operating characteristics. In FIG. 3, a characteristic family of such engine output torque curves relative to engine output speed is shown in solid lines. The maximum torque curve at maximum or 100% gasifier or compressor speed (Nl) is curve TQ at Nl = 100%. The lower torque curves are at lower percents of maximum compressor speed, such as the idle torque curve 55 at 55% of maximum compressor speed provided at the idle fuel feed position of throttle lever or pedal 33. FIG. 3 also shows a similar family of power curves, dotted lines, the maximum power curve at maximum or 100% compressor speed Nl, curve HP at Nl% = 100 and lower power curves at lower percents of maximum compressor speed, such as the idle power curves 55. The engine supplies torque and power to the engine accessories 47 and delivers by engine output or transmission input shaft 56 the engine output torque and engine output power as shown by these curves in FIG. 3 to drive the vehicle accessories 55 and to drive the transmission to drive the load or vehicle. The FIG. 4 curves, typical data for such engines, show throttle displacement, solid line curve TD, and compressor discharge pressure, dotted line curve CDP, both plotted against percent gasifier or compressor speed from 55%, idle, to maximum 100%. The engine output shaft 56 speed varies from 0 to a maximum of about 2,800. With the throttle at idle, the no load idle speed is a high idle speed, e.g., 1,600. No load means that the compressor shaft is driving the engine accessories 47 and output shaft 56 is driving the vehicle accessories 55, but the transmission is in positive neutral disconnecting any transmission load. Also with the throttle at idle, as explained below, the transmission, on a shaft to first ratio preparatory to initiating a load or vehicle drive, provides a low idle speed regulating load to regulate the engine low idle speed, e.g., about 800 rpm. The power transfer clutch is at least partially disconnected at speeds below power transfer clutch lock up. The compressor or gasifier speed is 55%, e.g., 21,000 rpm at idle and increases to a maximum or 100% e.g., 37,000 rpm. In this power train employing this transmission, it is important that the engine will function to provide torque at stall and preferably provide increasing torque as the speed decreases from idle with increasing throttle and maximum torque at stall and full throttle.

TRANSMISSION FLUID COUPLING AND STARTING CLUTCH

The engine output shaft 56 has a terminal splined portion 61 connected by splines 62 to an input sleeve 63 constructed as part of the forward wall 64 which with the rear wall 65 forms the coupling and clutch rotary housing 66. The rear wall 65 is formed by the coupling pump shell member 67, secured to the forward wall 64 by bolts 68, and a clutch housing member 69 secured by screws 71 to the coupling shell member 67. The fluid coupling 72 is formed by the coupling pump shell member 67 and a turbine shell member 73 having inner portion 74 secured by screws 75 to the clutch output member 76. The coupling turbine member 73 is thus drive connected through the clutch output member 76 and the spline connection 77 to the input coupling and input clutch output shaft or transmission intermediate 78. The pump shell member 67 and the turbine shell member 73 of the fluid coupling have respectively a semitoroidal pump inner shell 81 having radial pump vanes P and a semitoroidal turbine inner shell 82 having radial turbine vanes T forming the fluid coupling toroidal flow chamber 83 having a circular cross section as shown in FIG. 2a. In a preferred embodiment, the ratio of the torus outer diameter TD to the toric cross section diameter SD is about 16 to 1. This ratio of torus outer diameter to toric section diameter may vary from about 7:1 to 20:1 and is selected to provide a proper size and capacity fluid coupling so that a conventional size multiplate slip starting clutch 84 having a capacity for transmitting full engine power may be located concentrically within the fluid coupling 72. The starting clutch 84 is capable of carrying maximum torque like the gearing input clutches 136 and 137 and has some identical parts, i.e., the clutch plates and piston. The fluid coupling has a low torque and power capacity, 5% to 20% relative to full or maximum engine torque and power and thus is not intended to transmit any major portion of engine torque and power but is selected to regulate engine speed at a low drive initiating idle speed for smooth engagement of the input starting clutch as described below in connection with the operation of the transmission. With regard to the torque and power transmitted by the fluid coupling, the drive TQ and drive HP curves, FIG. 3 also called coupling input torque capacity and coupling input power capacity curves, show respectively that in the preferred embodiment, the coupling has a capacity to transmit a small portion, e.g., about 10%, of full engine torque and power under the normal driving condition approaching lock up about 10% slip, or the maximum speed ratio (output speed divided by input speed) i.e., .9. The STALL TQ and STALL HP curves FIG. 3, the conventional stall input torque capacity and stall input power capacity curves at zero speed ratio, show at point A respectively that the coupling at stall provides the necessary additional load on the engine to regulate the engine speed at the low idle speed. At the low idle speed, point A on the stall torque curve, e.g., about 800 rpm, the sum of vehicle accessory torque plus coupling stall torque equals engine idle torque, curve -55. This relationship may also be stated as the net engine input torque to the transmission at this low idle speed, the engine output torque at idle, idle TQ curve 55, minus the vehicle accessory torque load, equals coupling stall torque at this low idle speed, point A. The rising coupling stall torque capacity, STALL TQ curve, indicating increasing coupling stall torque with increasing engine speed, crosses over the flatter net engine input torque with increasing engine speed at normal or mean vehicle accessory torque load which is a curve not shown parallel to and below engine idle torque curve 55 at point A with a sufficient difference in the rate of change of the functions, curve slope, to regulate idle speed at point A. Auto regulation is provided since an increase of vehicle accessory load would reduce idle speed, which would reduce coupling stall torque and increase engine torque, to provide a large increase of torque available for vehicle accessory drive with a small speed reduction. Conversely a decrease of vehicle accessory load permits an increase of engine speed, increasing coupling stall torque and decreasing engine torque, to provide a large reduction of torque available for vehicle accessory drive with a small speed increase. Thus the fluid coupling stall torque load regulates engine low idle speed in a very narrow speed range substantially at point A.

The slipping starting clutch 84 has an outer drum 86 formed as a portion of, or secured to the clutch member 69 so that the drum 86 is input driven. The inner drum 87 is formed as a portion of the coupling and clutch output member 76 and is the driven drum driving the coupling and clutch output or intermediate shaft 78. A plurality of clutch plates 88 with alternate plates splined to the outer drum 86 and intermediate plates splined to the inner drum 87 transmit torque between the drums. A fixed abutment 89 is suitably splined to the outer drum 86 and secured in axial position by suitable means such as the snap ring shown.

The clutch housing member 69 of the rotary housing rear wall 65 has formed on its inner side a stepped cylinder 91 receiving the stepped piston 92 which has suitable seals with the cylinder at its inner and outer diameter. A throttle varied starting clutch apply pressure is supplied by starting clutch apply line 93 through a wall portion 94 of the transmission housing 95 to the transfer bushing 96 to the hub portion 97 of the housing member 69 to a passage 98 having a restriction 99 therein to limit fluid flow to the cylinder 91 to smooth clutch engagement. The cylinder 92 has a restricted bleed 101, smaller than restriction 99, therein to continuously bleed fluid from the cylinder 91 to coupling feed to equalize minor tolerance variations when the controls are intended to supply equal clutch apply and release pressures. The coupling supply line 103 is connected through the housing and to a transfer bushing or sealed clearance space 104 between axially facing portions of wall 94 and hub 97 to the passage 106 extending to the port 107 in hub 97 to continuously supply coupling supply fluid to fill the space between the clutch output member 76 and clutch plates 88 on one side and the piston 92 on the other side so the coupling supply pressure functions as a clutch release pressure acting on the piston 92. The fluid contacts the inner surface of inner drum 87 where it passes through a large number of circumferentially and axially spaced apertures 108 to supply cooling fluid to the clutch plates under the centrifugal pressure head of the rotating drum. After passing through the waffle grooved clutch plates, the fluid passes through the circumferentially and axially spaced apertures 109 in the outer drum 86 to flow through the coupling supply passage 111 to the coupling chamber 83. The flange 112 within the inner drum 87 adjacent piston 92 limits fluid flow between the end plate and piston so a large portion of the oil flows between the plates for cooling. The oil flowing between the end plate and piston passes through the recessed or apertured apply ring portion passage provided by the recesses or apertures in 114 of the piston 92 and joins with oil flowing from bleed 101 to flow through apertures 109 to the coupling feed passage 111 which supplies fluid through the inner gap between the toric shells 81 and 82 to the torus chamber 83. The fluid flows during coupling rotation under centrifugal head out of the outer gap between these torus shells and radially inwardly between the forward wall 64 and the turbine member 74 and output member 76 providing a radially inwardly directed exhaust passage 116 and then through bearing 117 to the coupling outlet passage 118 in shaft 78 and the housing. The radial and axial thrust bearing 117 supports and locates rotary housing 66 for rotation relative to the output member 76 and shaft 78. Excess fluid flow to the coupling, in the coupling feed passage 111, flows between the coupling turbine member 74 and the clutch abutment member 89 radially inwardly to one or more bypass pressure control apertures 119 extending through the inner portion of turbine member 73 to the exhaust passage 116. The bypass pressure control aperture 119 is located a sufficient distance radially inwardly of the inlet flow gap between the toric shells 81 and 82 so that a centrifugal pressure is maintained at the gap to provide oil circulation through the coupling chamber 83 proportional to the speed of rotation for maintaining proper cooling circulation. The seal 121 between the inner portion 74 or drum 87 and abutment 89 prevents fluid flow through the apertures 108 in the inner drum 87 bypassing the clutch plates and flowing to bypass aperture 119. The rotary housing 66 and hub or output member 76 and hub 97 are further relatively axially located by the thrust bearing 123 between the member 76 and the front portion of rear wall hub 97 so the rotary housing 66 and the assembly therein is axially located relative to shaft 78 which is axially located in the gear unit.

TRANSMISSION GEAR UNIT

The transmission housing 95 has a coupling portion 126 enclosing coupling 72 and a gear portion 127 enclosing transmission gearing 130 having three planetary gear sets 131, 132 and 133. The coupling turbine T is splined to transmission gear input or intermediate shaft 78 which is splined to drive a clutch housing 134. The clutch housing 134 is drivingly connected to two input clutches 136 and 137.

The forward clutch 136 includes a plurality of alternately spaced plates 138 and 139 which are splined to the clutch housing 134 and a hub 141 respectively. A piston 142 is slidably mounted in the clutch housing 134 and cooperates therewith to provide a pair of cylinder fluid chambers 143 and 144 which, when pressurized, urges the piston 142 to engage the clutch plates 138 and 139 thereby applying the clutch 136. The return spring 146 is held in compression between the piston 142 and a spring retainer 147 which is mounted on the housing 134. The return spring 146 moves the piston 142 out of engagement with the clutch plate when the chambers are not pressurized. A passage 148 in the housing 134 is adapted to supply fluid to the chambers 143 and 144.

The fourth and reverse clutch 137 includes a plurality of alternately spaced plates 151 and 152 which are splined to the drum extension 153 of clutch housing 134 and to a drum 154 respectively. A piston 156 is slidably mounted in the drum 154 and cooperates therewith to provide a fluid chamber 157 which is adapted to be pressurized to engage the clutch 137. A passage 158 in the drum 154 conveys fluid pressure to the chamber 157. A return spring 161 is compressed between the piston 156 and a spring retainer 162 which is mounted on the drum 154 and functions to move the piston out of engagement when the chamber 157 is not pressurized. A third brake 163 is also operatively connected with the drum 154 and includes alternately spaced plates 164 and 166 which are splined respectively to the drum 154 and by spline 170 to the transmission housing portion 127. A piston 167 is slidably mounted in the central web 168 and cooperates therewith to provide a fluid chamber 169 which is adapted to be filled with pressure fluid supplied by line 171 to engage the brake 163. A plurality of return springs 172 abutting fixed plate 173 are provided to maintain the piston out of engagement with the plates 164 and 166 when chamber 169 is exhausted so the brake is disengaged.

The central web 168 is secured to the transmission housing by a spline 170 and has a plurality of fluid passages 158, 171 and 174 which are adaptive to supply pressure to the fourth and reverse clutch 137, the third brake 163, and second brake 176 respectively. The passage 158 is connected with an axial recess 178 at the inner diameter of the web 168 which is in communication with the passage 179 via annular transfer recess 181. The passage 171 is in communication with the chamber 169 of the brake 163. The web 168 also provides rotational support for sleeve shaft 182 which is splined to the drum 154 and for gear input shaft 183 which is splined to the hub 141 and rotatably journalled in the sleeve shaft 182.

The sleeve shaft 182 is splined to a sun gear 184 and has a sun gear 186 which are components of the planetary gear sets 131 and 132 respectively. The planetary gear set 131 also includes a plurality of planet pinions 187 which are rotatably mounted in a carrier 188 and mesh with the sum gear 184 and a ring gear 189 which meshes with the planet pinions 187 and is drivingly spline connected by drum 191 to a carrier 192 of the planetary gear set 132 and a carrier 193 of the planetary gear set 133. The carrier 188 is operatively connected to the brake 176 which includes the plurality of alternately spaced plates 196 and 197 which are splined to the carrier 188 and housing splines 170 respectively. A piston 198 is slidably mounted in the central web 168 and cooperates therewith to provide a fluid chamber 199 which is adapted to be filled with pressure fluid by passage 174 to engage the second brake 176. A plurality of return springs 201 and fixed abutment plate 202 are provided to move the piston 198 out of engagement with the brake plates 196-197 to disengage the brake 176 when the chamber 199 is not pressurized.

The planetary set 132 includes a plurality of pinion gears 203 which are rotatably mounted on the carrier 192 and mesh with the sun gear 186 and a ring gear 204 which meshes with the pinions 203 and is drivingly connected through a hub 206 with sun gear 207 of the planetary set 133. The ring gear 204 and the sun gear 207 are splined to the gear input shaft 183 which is connected to the input clutch 136.

The planetary set 133 also includes a plurality of pinion gears 208 which are rotatably mounted on the carrier 193 and mesh with the sun gear 207 and a ring gear 209. The carrier 193, the carrier 192 and the ring gear 189 are drivingly connected to the transmission output shaft 211. The ring gear 209 is operatively connected to the first and reverse brake 212 which includes a plurality of alternately spaced plates 213 and 214 which are splined to the transmission gear housing 127 and the ring gear 209 respectively. A piston 216 is slidably disposed in the partially shown rear wall 217 of the transmissin housing 127 and cooperates therewith to provide an apply chamber 218 which is adapted to be filled with pressure fluid by passage 219 to move the piston 216 into engagement with the plates 213–214 thereby applying the brake 212. Conventional return springs, not shown, are provided to move the piston 216 out of engagement with the brake plates when the chamber 218 is not pressurized.

The forward clutch 136 and the reverse clutch 137 have the same size plates as they carry full engine torque and power when used for forward and reverse drive. These same plates are used in the starting clutch 84 and other parts such as pistons 156 and 92 the fixed abutments are common.

The gearing when fluid pressure is supplied by the lines to the motor chambers for the clutches and brakes as indicated in the following shift table by X and the others exhausted E provides the indicated drive ratios. The above described clutches, brakes and lines are also named with respect to their ratio drive function.

SHIFT TABLE

| Cl. or Bk. | Clutches | | Brakes | | |
|---|---|---|---|---|---|
| Ratio Function | Forward | 4th & Rev. | 3rd. | 2nd. | 1st. |
| Reference No. | 136 | 137 | 163 | 176 | 212 |
| Line or Passage Reference No. | 148 | 159 | 171 | 174 | 219 |
| Motor Chamber | 143–144 | 157 | 169 | 199 | 218 |
| 1st Forward | X | E | E | E | X |
| 2nd Forward | X | E | E | X | E |
| 3rd Forward | X | E | X | E | E |
| 4th Forward | X | X | E | E | E |
| 1st Reverse | E | X | E | E | X |

CONTROLS — FLUID SOURCE

The transmission has a sump 226 collecting leakage and exhaust fluid from the transmission control and lubrication systems. A suction line 227, which may include a screen, is connected to the pump 228 to deliver fluid under pressure to the main line 229. The pump 228 is driven by power transfer engine shaft 46 by a suitable engine accessory drive train which also drives other engine accessories 47 whenever the engine compressor 11 is driven by the compressor turbine 13. Thus the pump 228 is driven, when the engine is operating at stall, both idle speeds or any driving speed of the output shaft in a speed range proportional to the compressor speed range, e.g., 20,000 to 37,000 rpm. The compressor cannot be stalled by load like the power turbine 22, engine output shaft 56 and transmission output shaft 211.

MODULATOR PRESSURE REGULATOR VALVE

The modulator, gas pressure of torque demand pressure regulator valve 231 provides a modulator pressure signal in line 232, inversely proportional to compressor discharge gas pressure in compressor discharge chamber 17 and compressor discharge gas pressure line 37. The modulator regulator valve 231 has a valve element 233 having equal diameter lands $a$ and $b$ movable in a bore 234 in valve body 235. The modulator signal line 232 is always connected to bore 234 between the lands $a$ and $b$ of valve element 233. The main line port 236 is closed by land 233$a$ and exhaust port 237 is closed by land 233$b$ with a small overlap, so a small opening regulating movement opens the main line port 236 and a small closing regulatory movement opens exhaust port 237 to regulate compressor discharge pressure in line 232. Spring 238 in chamber 239 is seated on spring seat 240 and biases the valve element 233 in an opening direction. Exhaust 241 vents spring chamber 239. A fixed stop 242 limits closing movement of the valve element. The modulator signal line 232 is connected by restricted branch 243 to supply modulated pressure to bias chamber 244 in the end of bore 234 closed by wall 248 to act on the free end of land 233$a$ in a closing direction and on the end of pin 246 slidable mounted in bore 247 in wall 248. A restricted passage 249 between main line 229 and modulator line 232 improves regulation. A roll diaphragm 251 has the outer edge clamped in a recess 252 around the end of large bore portion 253 in the compressor discharge pressure actuator body 254 by an end closure 255 suitably secured to the actuator body. The diaphragm is centrally secured by a washer 256 rivetted on a button on the end of large land $a$ of piston 257. The space between land $a$ of piston 257 and larger bore 253 accommodates the roll diaphragm. The chamber 258 between the diaphragm 251 and closure 255 is connected to compressor discharge gas line 37 to apply a compressor discharge pressure force through diaphragm 251, piston 257 and pin 246 to valve element 233 in a closing direction. The piston 257 has a small land $b$ having a non sealing free sliding fit in small bore portion 259 to guide the piston. The bores 253 and 259 between diaphragm 251 and wall 248 are vented by exhaust 261. The valve body 235 and actuator body 254 are mounted on the transmission housing with the bores aligned.

Figure 4:
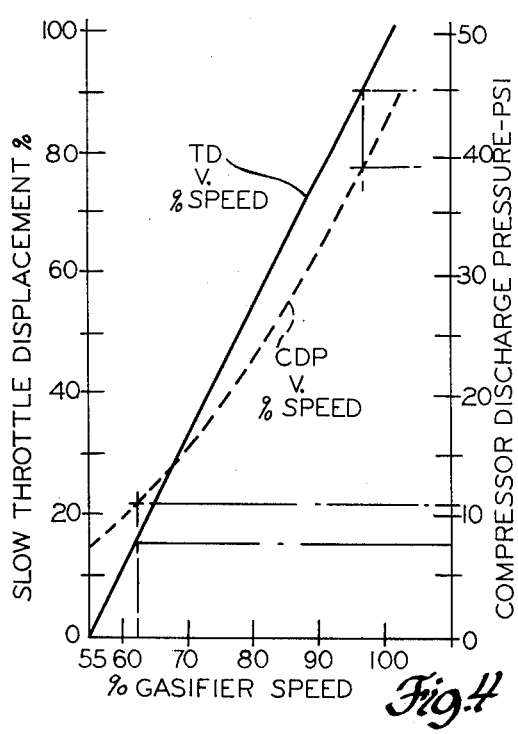
FIG. 4 is a plot of throttle displacement and compressor discharge pressure relative to the percent of full gasifier speed.

The compressor discharge gas pressure, curve CDP, FIG. 4, in chamber 258 provides a force reduced by the force of modulator pressure acting on pin 246 to provide a net force acting with the modulator pressure bias in chamber 244 against spring 238 to provide inverted modulator pressure, MOD PRESS, PSI in line 232 as shown by the dotted line modulator valve data curve 263 relative to compressor discharge pressure CDP, PSI. The spring force determines the maximum modulator pressure in the low throttle range and the diameter of pin 246 and diaphragm determines the extent of the low throttle range having constant maximum modulator pressure and the area of diaphragm 251 determines the slope of the reducing modulator pressure. The solid line curve 262 is a plot of the curve 263 as indicated by the dotted construction lines to show modulator pressure relative to throttle displacement T.D. in percent. The modulator pressure has a constant maximum value in a small low throttle range, e.g., 0% or idle to 15% throttle, decreases gradually and progressively as throttle increases in a large middle range, e.g., 15% to 90% throttle, and has a constant small or zero value in a small high throttle range, e.g., 90% to 100% throttle.

MAIN PRESSURE REGULATOR VALVE

The conventional main line pressure regulator valve 266 has a valve element 267 having equal diameter lands $a$, $b$, $c$ and $d$ and larger land $e$ in stepped bore 268. The main line 229 is directly connected to port 269 which is always connected to and through bore 268 to the continuing main line 229, and by axial passage 271 to the recess between lands $a$ and $b$ and past the restriction of restriction land $a$ to chamber 272 to bias the valve element in a closing direction. The spring 273 in chamber 274 vented by exhaust 276 is seated on abutment 277 and biases the valve element 267 in a closing direction to the closed position shown. Excess main line pressure in chamber 272 opens the valve connecting main line port 269 first to supply coupling feed port 278 and coupling feed line 103 and then between lands $b$ and $c$ to exhaust 280 to regulate main line pressure at a high value for reverse drive. Opening valve element movement is limited by stop 281. The knockdown pressure line 282 is connected to the step of bore 268 between large land $e$ and smaller land $d$ to act on the unbalanced area of land $e$ to reduce main line pressure for forward drive and in neutral.

COUPLING AND LUBRICATION FEED

The coupling feed line 103 pressure is controlled by the coupling pressure regulator valve 286 which has a spring 287, seated on the fixed abutment 288 closing the end of bore 289 biasing valve element 290 guided on pin 291 against seat 292. The abutment 293 closes the converter pressure end of the bore, supports the pin and holds the seat in position against a shoulder in the bore. The converter feed line 103 is connected to the converter pressure end of the bore and acts on the valve element 290. The converter feed pressure, when it exceeds the regulated value, an intermediate pressure less than forward main line pressure, opens valve element 290 against the spring bias and the low pressure bias in cooler outlet line 294 to connect excess fluid in the converter feed line 103 to the cooler outlet line 294 and the lubrication feed line 296. In FIG. 2b, the cooler outlet and lubrication feed line pressure is regulated at a low valve by the conventional lubrication regulator valve 297, which in response to pressure above the low cooler outlet and lubrication pressure value moves the valve element 298 from its seat against spring 279 to connect excess fluid to exhaust 301. The lubrication feed line 296 is connected to the central bore passage 302 in shaft 183 to lubricate the transmission. The coupling feed line 103 is connected as described above to cool the clutch 84, provide a clutch release pressure and feed or supply the operating chamber of coupling 72. Coupling exhaust flows via coupling outlet line 118, through cooler 303 and cooler outlet lines 294 to lubrication feed line 296.

SELECTOR VALVE

The selector valve 306 has a valve element 307 having equal diameter lands $a$ and $b$ in bore 308. The main line 229 is connected to the space between the lands in all valve element positions. The forward drive line 309 and reverse drive line 311 as indicated by the following table are supplied by the main line X or connected to exhausts E 312 or 313 in each valve position.

| Valve Position | Knockdown Line 282 | Forward Drive Line 309 | Reverse Drive Line 311 |
|---|---|---|---|
| Neutral N | X | E 312 | E 313 |
| Forward Drive D | X | X | E 313 |
| Reverse Drive R | E 212 | E 312 | X |

CLUTCH PRESSURE REGULATOR VALVE

The clutch pressure regulator valve 316 has a valve element 317 having small equal diameter lands $a$ and $b$ in small bore portion 318 and larger diameter land $c$ in larger diameter bore portion 319. Valve element movement is limited by C washer 320 trapped between lands $a$ and $b$ and in the port of main line 293. With the valve element 317 in the full open position as shown, the main line 229 is connected between lands $a$ and $b$ to the starting clutch apply line 93 connected to the starting clutch apply chamber or cylinder 91 which has the continuous restricted bleed 101 as described above and by restricted branch 321 of the clutch apply line to supply clutch apply pressure to biasing chamber 322 at the closed end or bore 318. The clutch pressure in chamber 322 biases the valve element 317 in a closing direction regulating clutch pressure by closing the port of main line 229. An exhaust at this valve is not required as the clutch pressure line has a continuous restricted connection to exhaust through bleed restriction 101. The modulator line 232 is connected at the step between bores 318 and 319 and acts on the unbalanced area of land $c$, the area of land $c$ minus the area of land $b$, in a valve closing direction.

The valve opening bias means has an abutment piston 323 slidably mounted in cylinder bore 324 for movement from the neutral position shown to a drive position. The piston has a lip or O ring seal 325 to prevent leakage of the differential pressure between main line and coupling feed pressures past the piston. An end closure 326 fixed to the valve body closes the end of bore 324. The bore 324 ends at the stop shoulder or step 327 to smaller spring bore 328 which ends at spring abutment shoulder or step to the end of bore 319. The piston has a sleeve portion extending from the piston portion past the spring bore into the adjacent end of bore 319 with the outer diameter of the sleeve in sliding sealing engagement in bore 319 in all positions. The end of sleeve 331 has slots 332 so the sleeve cannot seal with the adjacent end of land $c$ in the event they should contact each other as the sleeve in drive position limits closing movement of valve element 317. The piston return and timing spring 333 located and guided between the spring bore 328 and the sleeve 331 is seated on spring shoulder 329 and engages piston 323, aiding the coupling pressure bias, to bias the piston to the neutral position shown when chamber 334 between the piston and closure 326 is exhausted. The forward drive line 309 and the reverse drive line 311 are both connected to shuttle valve 336 which has a free ball 337 responsive to pressure supplied by either the forward or reverse drive line 309 or 311 to close the other line which is exhausted and supply main line pressure to forward or reverse drive line 338 which closes the check valve bypass passage 341 so all flow is through restriction 339 to chamber 334 to move piston 323 slowly against spring 333 to the drive position against stop shoulder 327. In neutral, when these drive lines 309, 311 and 338 are exhausted at the selector valve, coupling pressure and spring 333 return piston 323 to the neutral position shown. The exhaust flow is through the unrestricted exhaust check valve passage 341, which bypasses restriction 339, for quick return of this piston for neutral regulator valve operation. A coupling pressure biasing piston 342 in sliding sealed relation in the inner diameter of sleeve 331 has a force stem 343 to transmit the spring and pressure biasing force to the regulator valve element 317. A regulator spring 344 seats on the abutment piston 323 and through biasing piston 342 biases the regulator valve element 317 in an opening direction. The piston also has a spring stem 346 guiding and limiting compression of regulator spring 344. The diameter of biasing piston 342 is the same as land 317a. Coupling charging pressure line 103 is connected to spring bore 328 and through apertures 347 in sleeve 331 to the chamber 348 in the sleeve bore between the closed end at abutment piston 323 and biasing piston 342. Override line 349 is connected to the bore 319 centrally between land 317c and biasing piston 342 so overcontrol pressure will open the regulator valve terminating low pressure regulation of clutch pressure and connecting main line 229 to starting clutch apply line 93.

When the transmission is in neutral, chamber 334 is freely exhausted via check valve free exhaust passage 341, drive line 338 and either forward or reverse drive lines 309 or 311 to exhaust at the selector valve, so coupling pressure and spring 333 return piston 323 to the neutral position shown and regulating spring 344 does not apply any force to piston 342. The coupling charging pressure supplied by line 103 acts on regulating piston 342 and is opposed by modulator pressure, maximum at idle throttle as indicated by curve 262, supplied by line 232 acting on the unbalanced area of land c. The areas of land a and piston 342 are equal and the differential area of land c relative to the maximum modulator pressure at idle throttle position, curve 262, provide a clutch apply pressure normally less than and only equal to converter feed or clutch release pressure at zero modulator pressure at full throttle, so differential (Δ) clutch pressure is zero or less, to fully release the clutch. The restricted bleed 101 in the clutch piston 92 insures that any small differential in these pressures resulting from tolerance variations of regulators and line pressure drop is equalized to insure clutch release.

When the transmission is shifted to forward or reverse drive, main line pressure supplied by drive line 338 through restriction 339 to chamber 334 moves piston 323, slowly in a time delay period due to the pressure rise required to compress timing spring 333, against stop shoulder 327 so regulator spring 344 provides only after forward or reverse drive is established, an opening force on the regulator valve 317 equal or slightly larger than the maximum modulator pressure closing force. Thus at maximum modulator pressure, initial portion of curve 262, FIG. 5, the opening force provided by coupling feed and clutch release pressure and the regulator spring is opposed by modulator and clutch apply pressures to provide a clutch apply pressure equal or preferably slightly larger than clutch release pressure or a low differential clutch apply pressure, e.g., 2 psi Δ press, the initial portion of curve 352, FIG. 5. The Δ clutch apply pressure proportional to decreasing modulator pressure as indicated by curve 351 determined by clutch regulator valve data. As throttle displacement increases, the differential clutch apply pressure increases as indicated by curve 352 which is plotted from curve 351. Thus in a low throttle range, e.g., O or idle to 15%, differential clutch pressure, curve 352, is a constant low value, e.g., 2 psi Δ -press., in a large middle throttle range, e.g., 15% to 90%, the differential clutch pressure gradually and progressively increases to maximum clutch pressure at a high throttle displacement or position, e.g., 90%, and in a high throttle range to full throttle, e.g., 90% to 100%, differential clutch pressure is a constant maximum.

OVERRIDE VALVE

The override valve 356 has a valve element 357 with land a and larger diameter land b slidable in a stepped bore 358. A spring 359 in the spring chamber 361 is seated on abutment 362 and engages land b to bias the valve element to the exhaust low speed position shown. The spring chamber 361 has a vent exhaust 363. The abutment 362 has a valve movement and spring guide pin 364. A conventional output shaft governor 366 driven by output shaft 211 is supplied by main line 229 and provides a governor pressure signal proportional to output speed in governor signal line 367 which is connected to chamber 368 in the closed end of bore 358. Governor pressure acting on land a is insufficient at low vehicle speeds to overcome the spring 359 and the spring holds the valve element in the low speed position connecting override line 349 between the lands to exhaust 371 and land b blocks main line 229. As speed increases, at a predetermined low vehicle speed, e.g., 6 mph, governor pressure opens or moves the valve to the high speed position connecting main line 229 between the lands to act on the differential hysteresis area of larger land b to prevent hunting and to feed override line 349 and land a blocks exhaust 371. As speed decreases, the override valve closes at a predetermined lower speed due to this hysteresis to, on a closed throttle brake stop retain engine braking to this lower predetermined speed. The override pressure in line 349 at the main line pressure valve is connected to bore 319 of clutch pressure regulator valve 316 and acts on land 317c to open valve element 317 to connect main line 229 between the lands 317a and b to supply main line pressure to clutch pressure line 93 for full capacity clutch engagement for drive as speed increases above the low vehicle speed, e.g., 6 mph, and as speed decreases to the lower vehicle speed for engine braking.

SHIFT CONTROL

The transmission shift control 373 may be a conventional manual power shift control or an automatic governor pressure and modulator pressure controlled system as shown, e.g., in the Schaefer et al U.S. Pat. No.

3,691,872 patented Sept. 19, 1972. Such a shift control receives the fluid pressures supplied by main line 229, forward line 309, reverse line 311, modulator line 232 and governor line 367 and selectively supplies fluid pressure to the forward clutch line 148, fourth and reverse clutch line 159, third brake line 171, second brake line 174 and first brake line 219 as indicated by the above shift table to provide first ratio drive when the selector valve moves to drive position and an automatic shift to second through fourth forward ratio drives all above the low speed, e.g., 6 mph, and first reverse drive when the selector valve is moved to reverse position. The coupling starting clutch drive functions with throttle controlled clutch apply pressure for standing starts in first forward and reverse drives and for less than low speed starts in these drives and second forward drive if provided at such low speeds.

OPERATION

When the gas turbine engine 10 is started and running, the compressor shaft 14 runs at a high speed, e.g., 20,000 to 37,000 rpm and through reduction ratio, e.g., 8:1 drives compressor power transfer shaft 46 in a low speed range, e.g., 2,400 to 4,500 rpm. Shaft 46 thus drives conventional belt or gear driven engine accessories 47 which include transmission pump 228 at a proper speed whenever the engine is running. The engine output shaft 56 drives the conventional vehicle accessories which include the belt or gear drives and electric generator or alternator, fluid pumps, air conditioner, etc. Such vehicle accessories have a limited speed range for proper operation in which they are functional and durable. Thus the range of engine output shaft 56 speed from minimum idle speed to maximum speed, e.g., 800 rpm to 2,800 rpm, is limited to provide the proper limited accessory speed range. While it is preferable to operate such vehicle accessories in the middle and upper portion of the speed range, they will function properly at the low idle speed, e.g., 800 rpm. The minimum or low engine idle speed also reduces the engine 10 and transmission rotary housing 66 inertia energy level as compared to the no load high idle speed to a proper low speed and energy level for smooth starting drive establishment. At the high idle speed it is difficult to engage the starting clutch without excessive shock. The low idle speed provides a proper engine inertia energy level sufficiently low to permit smooth controlled starting clutch drive establishment and high enough to provide significant energy to the drive as the vehicle is started. Also at this idle speed the engine is functioning at sufficient speed under the idle control load so it is very responsive to throttle advance. The lower speed also provides quicker responsive operation to throttle advance.

When the engine is running, pump 228 supplies fluid to main line 229 which is regulated by the main line regulator valve 226 in forward drive at a high pressure, e.g., 150 psi, and in reverse drive at a higher pressure, e.g., 200 psi. The main line regulator valve connects the first overage to the coupling feed line 103. The coupling feed presure is regulated at the maximum value by the coupling pressure regulator valve 286 and has variable intermediate values which vary with engine gasifier speed, throttle, cooler restriction, tolerance variations, etc., e.g., 15 psi to 90 psi, and is normally mimimum, e.g. 20 psi, at idle and quickly increases with advancing throttle and stabilized at the maximum regulated value, e.g., 90 psi, at full throttle. The overage is connected to the lower pressure lubrication line 296 regulated by the lubrication regulator valve 297.

The engine is capable of functioning to provide torque at stall, zero output speed. The torque increases with increasing throttle and also with decreasing output speed. Power increases with increasing throttle and output speed. Gas turbine engines of the two spool type having independent or variable power transfer connected compressor and power turbines basically have such characteristics. The preferred two spool gas turbine engine 10, having a variable power connection, clutch 48, between the compresor and power turbines has improved characteristics since the power transfer clutch provides an optimum combination of two spool and single spool operating characteristics in the operating speed range and single spool operating characteristics at maximum speed to provide maximum torque at engine stall and a low rate decrease of torque with increasing speed so the minimum torque at maximum speed is higher. The decreasing torque and increasing power relative to engine output speed delivered to the engine power output shaft 56 is shown, e.g., by the FIG. 3 family of torque curves (TQ), solid lines and family of power curves (HP), dotted line, each family of curves from a minimum, 50%, to a maximum, 100% of gasifier shaft 14 speed Nl which is proportional to throttle advance or displacement TD. These torque and power curves are plotted relative to engine output speed. Idle torque and power are at a predetermined gasifier speed, e.g., 55% curves 55, FIG. 3. The characteristic relation in this engine of throttle displacement and compressor discharge pressure relative to percent gasifier speed are shown respectively by curve TD and curve CDP in FIG. 4. The idle torque is sufficient to drive the vehicle accessories at a mid range engine output speed, e.g., about 1,600 rpm, the no load idle speed, as there is only the continuously connected vehicle accessory load and no transmission connected load.

Figure 5:
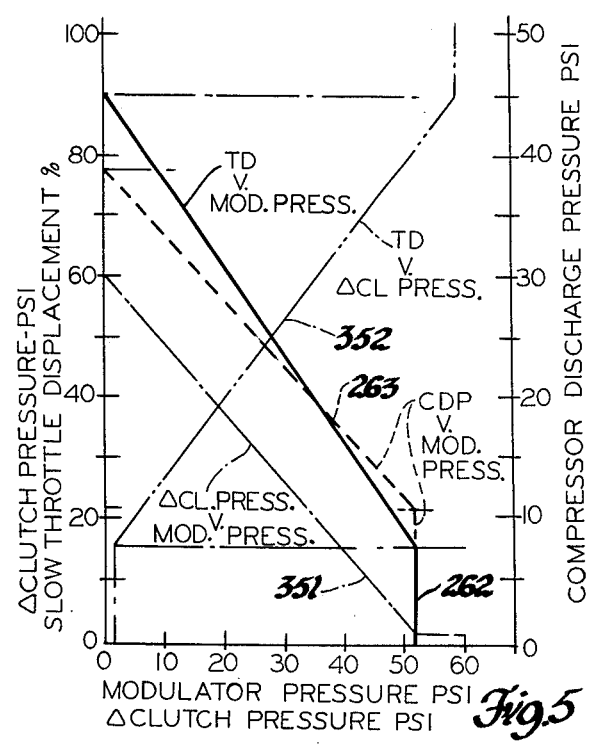
FIG. 5 is a plot of throttle displacement, compressor discharge pressure and differential clutch pressure relative to modulator pressure and also shows the relationship of throttle displacement to differential clutch pressure.

When the engine is running and the transmission selector valve 306 is in neutral position, the controls provide a positive neutral in the gear unit, all gear ratio drives are disengaged, so there is no vehicle load on the engine and the engine will operate at no load idle speed for optimum engine and vehicle accessory drive. During neutral operation, pump 228 supplies fluid which is regulated by the modulator pressure regulator valve 231 in response to compressor discharge pressure at modulator pressure in line 232 as shown in FIG. 5, relative to compressor discharge pressure, curve 263 and relative to throttle displacement, curve 262. The modulator pressure and coupling feed and clutch release pressure control the clutch regulator valve 316 and provide a clutch apply pressure similar to curve 352 but less as spring 344 does not provide a bias force so the differential clutch pressure is zero or less so the starting clutch is fully disengaged in all throttle positions. Engagement of clutch 84 and the drive of coupling 72 cannot load the engine as the gearing is in positive neutral.

Figure 8:
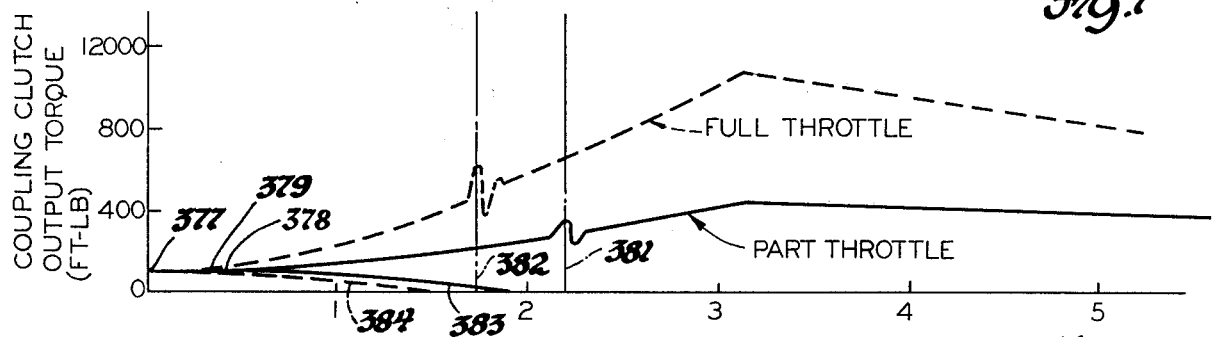
FIG. 8 is a plot of coupling output torque relative to time during starting.

When the vehicle or other load is stationary and the selector valve is moved to drive or reverse positions so quickly first engage first forward or reverse gear ratio drive, the coupling turbine T is stalled providing a predetermined coupling stall load, torque and power, respectively, e.g., FIG. 3, curve STALL TQ and STALL HP. The coupling has a very small, 10%, slip drive torque and power capacity compared to maximum engine torque and power output, e.g., 10% of maximum engine output as shown by the drive torque and drive power curves respectively curves DRIVE TQ and DRIVE HP. The low capacity coupling is constructed with a high ratio of outer torus diameter to toric section diameter, e.g., about 7:1 to 20:1, so the coupling due to the larger torus diameter has higher centrifugal force and greater efficiency and a conventional size full capacity friction clutch fits within the torus. The coupling provides at a minimum proper accessory drive idle speed, e.g., 800 rpm, a coupling stall torque load which when added to the normal vehicle accessory torque load equals the engine torque output at this speed or which equals available net engine torque. Since the coupling torque increases steeply with increasing engine speed and also because the engine torque increases with decreasing engine speed, the coupling provides auto regulation of engine speed substantially at a predetermined minimum proper accessory idle speed. Accessory load change is accommodated in a small speed range, since a resulting small speed change provides an auto correcting change in coupling and engine torque so the torque available for vehicle accessories matches their requirements. Thus with the vehicle standing on a shift to drive with the engine at idle the engine speed is regulated at a minimum idle speed and the small coupling torque, FIG. 3, point A, and original point 377 in FIG. 8, is applied to the wheels but is normally, such as from a standing start on level ground, insufficient to move the vehicle. The time delay restriction 339 and spring 333 delays movement of piston 323 to load regulating spring 344 so differential clutch pressure at any throttle position is not provided until after such coupling loaded engine operation is established. Then the force of regulating spring 344, reduced by the force of compressor discharge pressure on the differential area of land c and increased by the force of coupling feed and clutch release pressure on the same area as regulated clutch apply pressure provide the regulated clutch apply pressure which is the sum of differential clutch pressure and clutch release pressure. Since the clutch apply force is provided by the clutch apply pressure less the release pressure or the differential clutch pressure the later pressure is used to explain clutch operation.

At idle throttle displacement 0% it is preferred that the differential clutch pressure functioning to apply the clutch be very low, e.g., 2 psi, as indicated by FIG. 5, curve 352. The low pressure is merely sufficient so the plates of starting clutch 84 are moved from the fully disengaged position having slack into light or floating contact with the slack taken up and in moving contact, but insufficient contact to transmit and significant torque, so that the clutch with established rotary friction conditions responds consistently with minimal time delay to smoothly gradually increase clutch torque when the differential clutch pressure is increased.

During slow throttle displacement or steady state throttle operation, the differential clutch pressure is low, e.g., 2 psi, in a small low throttle range, e.g., 0% to 15% is increased progressively from the low pressure to a maximum in a large middle range, e.g., 2 to 60 psi proportional to throttle displacement in a large middle range, e.g., 15% to 90% and remains at maximum pressure, e.g., 60 psi in a small high throttle range to full throttle, e.g., 90% to 100% as shown by curve 352, FIG. 5.

Figure 6:
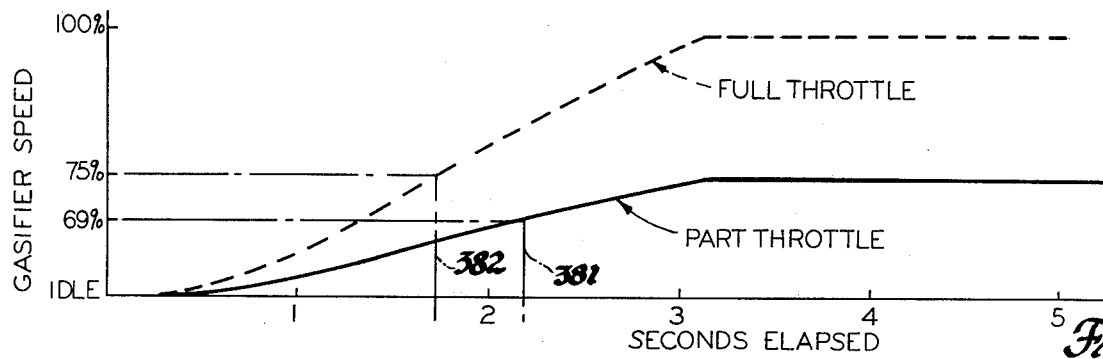
FIG. 6 is a plot of gasifier speed relative to time during starting.

When the throttle is advanced quickly to a part or full throttle position, several seconds elapse or there is a time delay, e.g., 3 sec., while the gasifier speed increases to the steady state gasifier speed for each throttle position as shown respectively by the sloped curve portion and the horizontal curve portion of the FIG. 6 curves. Thus relative to throttle position, the compressor discharge pressure, engine torque and engine power increase on essentially the same time delay slope curve during acceleration of the engine.

Figure 7:
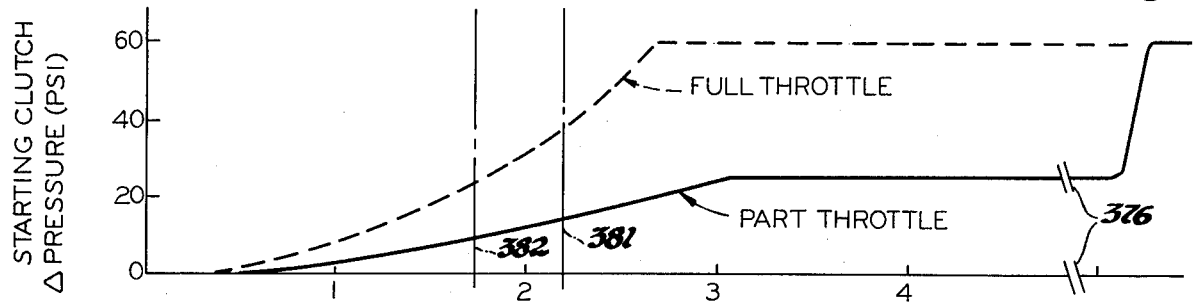
FIG. 7 is a plot of clutch pressure relative to time during starting.

Since the gasifier speed and compressor discharge pressure increase on a time delay curve, the differential clutch pressure increases on similar time delay curves shown in FIG. 7 during forward drive starting operation. The following description of the starting operation relative to FIGS. 3, 7 and 8 is specific to forward drive starting operation and then the minor differences in reverse starting drive operation are explained. The part throttle differential pressure curve, solid line, increases very similarly to the part throttle gasifier speed curve with some increase in rate with time indicated by the slight curvature. Also since part throttle differential clutch pressure increases proportional to gasifier speed, compressor discharge pressure and throttle displacement, the part throttle differential clutch pressure increases to the full steady state part throttle, e.g., $\Delta$ - 22 psi, differential clutch pressure in the same time delay period as gasifier speed. The steady state part throttle differential clutch pressure is maintained constant at the part throttle position through the time period indicated by the break 376, in the part throttle curve and time scale of FIG. 7, required to accelerate the vehicle to a low speed, e.g., 6 mph. At this low speed, the override valve overcontrols the clutch pressure regulator valve to supply main line pressure, e.g., 150 psi, to the clutch apply line 93 and cylinder 91 to apply piston 92 against the release pressure provided by the variable coupling charging pressure. While the maximum regulated differential clutch pressure during maximum coupling feed pressure is, e.g., $150 - 90 = \Delta$ 60 psi and is the same at lower coupling pressures due to the reduction of coupling feed pressure on the regulator valve, after override the clutch regulator valve does not regulate and clutch apply pressure is main line pressure, e.g., 150 psi, so with reduced coupling feed pressure the differential clutch pressure will increase.

The full throttle differential pressure curve, dotted line, increases at a higher increasing rate with time and in a shorter time delay period since at full or 100% throttle displacement the maximum differential clutch pressure, e.g., $\Delta$ 60 psi, is obtained at 90% gasifier speed. At 90% to full throttle the clutch pressure regulator valve also connects main line pressure, e.g., 150 psi, to apply against the release and coupling feed pressure, e.g., 90 psi, for maximum clutch apply differential pressure, e.g., $\Delta$ 60 psi.

With normal quick throttle advance, the total coupling and clutch torque is initially at the low coupling stall torque value, e.g., point A, FIG. 3, at the low engine idle speed at origin or zero time as shown, e.g., at zero time 377 of both the part throttle, solid line, and full throttle, dotted line, starting torque curves relating to time FIG. 8. Then the coupling torque gradually, and to a small degree, increases due to the small increase in coupling torque on the coupling stall torque curve caused by increasing engine speed while the vehicle is stationary, e.g., from point A to point B on the stall torque curve, FIG. 3, and from zero time point 377 to time point 378 on the part throttle torque curve and point 379 on the full throttle torque curve FIG. 8 where differential clutch pressure begins to increase as shown in FIG. 7. As indicated in FIG. 3, during this initial coupling drive, from point A to point B, the engine speed increases the engine inertia energy level. Then the differential clutch pressure, FIG. 7, begins to increase at an increasing rate relative to time to similarly increase slipping clutch torque, FIG. 8 until lock up occurs normally at an intermediate clutch differential pressure, FIG. 7, and torque, FIG. 8, at the time 381 for part throttle start and time 382 for full throttle start. The gasifier speed at full throttle lock up is greater than at part throttle lock up, e.g., in FIG. 6 at time 382 full throttle lock up is at 75% and at time 381 part throttle lock up is at 69% gasifier speed. Since the clutch pressure increases at a higher rate with increasing throttle, the gasifier speed and torque at lock up engagement increases with increasing throttle displacement and the time elapsed during slipping engagement to lock up is reduced with increasing throttle displacement as shown in FIG. 8. The slipping engagement time to lock up or 1:1 engagement at each throttle displacement increases with increasing torque load as higher differential clutch pressure is required for lock up engagement. The vehicle, during a normal starting drive, begins to move forward before lock up. After lock up the gasifier speed, FIG. 6, the differential clutch pressure, FIG. 7, and the engine output torque, FIG. 8, continue to increase accelerating engine and vehicle speed. The when gasifier speed reaches a steady state condition and the engine and vehicle speed continue to increase, the output torque, FIG. 8, decreases with increasing engine speed in accordance with the engine torque curves FIG. 3, and the powder increases with speed in accordance with the FIG. 3 power curves.

In FIG. 8, the total starting drive torque provided by the coupling and clutch at part and full throttle starts are shown respectively by the parts and full throttle curves. The coupling torque for part and full throttle starts are shown respectively by part and full throttle coupling torque curves 383 and 394. The friction clutch provides the difference between total torque and coupling torque. The smooth gradual increase of total starting drive torque is provided by the small gradual increase of coupling torque from zero time point 377 to time point 379 and then the initially engaging friction clutvh provides gradually increasing torque and the coupling torque is gradually reduced so the net or total torque very gradually initially increases at a slow rate to lock up. The coupling torque diminishes to zero approaching lock up because in the clutch engaging speed range, the lower portion of the input speed range, the coupling torque is insignificant relative to engine and load torque or substantially zero as shown by the drive torque at coupling, drive TQ curve FIG. 3.

This starting phase is also illustrated in FIG. 3, relative to engine output speed. With the engine operating at the regulated low idle speed, point A, when the throttle is advanced to full throttle position and under all vehicle loads, the engine torque and speed increase on the coupling stall torque curve to provide the initial very gradual torque increase. At point B, as the clutch has slipping engagement and clutch pressure gradually increases the torque the engine torque transmitted to the load increases and the engine speed is reduced along the line BC. The inertia energy of the speed reduction is used for driving during this speed reduction. The transition from curve AB to curve BC would appear to be a curve rather than a sharp change. The point B is shown at 60% gasifier speed torque, a minimum for a faster throttle advance. Though the steady state differential clutch pressure begins to increase at 15% throttle displacement providing about 63% gasifier speed, since there is more time delay in the increase of engine torque than the full throttle differential clutch pressure, the clutch begins slip engagement as shown in FIG. 3, at a lower torque, e.g., 60% gasifier speed torque. If the vehicle brakes are applied to hold the vehicle, maximum load, lock up will occur as the torque increases approaches point C and stall the engine from point C to D to provide maximum torque at D. Then if the brake is released the vehicle will be accelerated from D on the maximum torque curve, e.g., TQ at N1% = 100. Thus maximum torque is available for starting to move the vehicle. During the above operation on the torque curve, power is indicated by the coupling stall power curve STALL HP from A to B and then the dotted power curve B to zero engine speed and power.

At any point on this curve where engine torque provides the necessary load torque to move the vehicle the vehicle operation cuves will depart from curve BCD, FIG. 3. A representative high load full throttle start indicated by the curve BEF. When the slipping or locked up clutch drive begins to move the vehicle the engine speed reduction is decreased and torque increases more rapidly normally due to lock up engagement, e.g., curve BE departs from curve BC. Then engine and vehicle speed is increased at an increasing rate and the torque increase is reduced and merges with engine torque, curve BEF reverses curvature and merges with the 100% torque curve. During this speed and torque change the slipping clutch is locked up.

Figure 9:
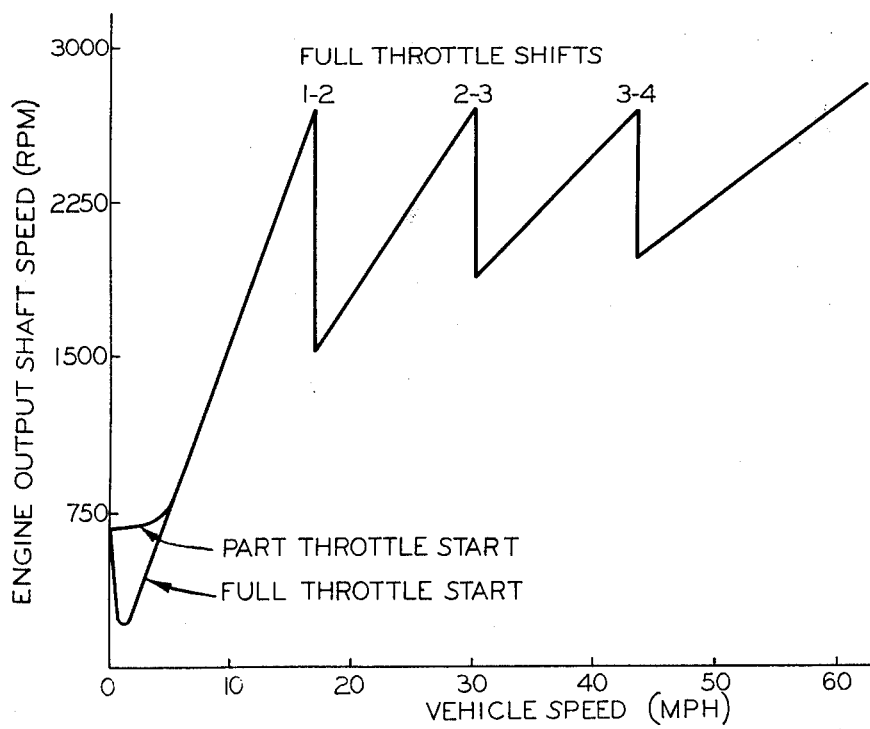
FIG. 9 is a plot of engine output speed relative to vehicle speed.

The shift curve shown in FIG. 9, a plot of engine output speed relative speed, demonstrates that the above described part and full throttle starting drive operation occurs below a low speed, e.g., 6 mph. That high and full throttle shifts cause a large depression of engine speed during starting operation as shown in FIG. 9. Most normal ratio shifts occur above the starting drive operation speed range. A closed or idle throttle two one shift may occur at less than this low speed e.g., 6 mph, so when the override control valve 356 activates the starting clutch control at this low speed during closed throttle, the starting clutch is disengaged but the second speed drive remains engaged. Subsequent throttle advance, while coasting with the starting clucth disengaged at these low speeds in either first or second ratio drive, will provide a smooth clutch engagement as in the above described standing start.

The reverse drive starting operation is the same as the above described starting operation for forward drive except that the main line pressure is higher in reverse, e.g., 200 psi. The clutch slipping drive and lock up for part and full throttle reverse starts is the same as in forward except that after override the starting clutch differential pressure rises to a higher level, the higher reverse main line press., less the same coupling charging pressure as in forward.

The coupling capacity is substantially equal to the idle load, about 10% of the maximum engine torque. Thus in the above description relative to the low idle speed auto regulating function of the coupling, the coupling stall torque increases steeply or at a high rate relative to the low torque load at low idle speed, but with respect to the starting drive operation for increasing torque from the low torque at low idle speed to a high or maximum engine torque the coupling torque increase is small and at a low rate relative to high starting torque.

In determining the transmission housing size, the mean diameter of the annular friction plates of the full torque capacity clutches is basically controlling. Clutch torque capacity is determined by the mean diameter and member of the friction surfaces an the apply force. Due to other practical considerations, the relation of the apply motor area to the mean diameter and the practical limitations on maximum apply pressure, the maximum apply force is related to the meaN diameter. Thus the full capacity transmission forward clutch 136 and the starting clutch 84 have the same mean diameter, plates and piston area. The starting clutch has more plates for more friction surfaces and requiring less force, since the starting clutch apply pressure is reduced by compressor discharge pressure and opposed by coupling charging pressure, as compared to the forward clutch. Thus the starting clutch structure with the high volume cooling flow has more heat rejection capacity for slipping engagement than the forward clutch.

The fluid coupling rotary housing 66 provides a housing chamber which has at its outer diameter the coupling toric chamber having an inner inlet and an outer outlet formed by the coupling pump P and turbine T. The housing chamber is divided by the turbine and its hub 74–75 into an exhaust passage from the toric chamber outlet adjacent the front wall and a clutch chamber adjacent the rear wall. The clutch 84 is located in the outer portion of the clutch chamber and has an apertured outer drum 86 mounted on the rear wall and an apertured inner drum 87 mounted on the hub 76 with waffle grooved plates 88 between the drums actuated by a motor having a piston 92 in cylinder 91 on the rear wall. The clutch cooling and coupling feed from passage 106 and port 107 enters the feed chamber portion within the inner drum 87 between the hub 76 and piston 92 on the rear wall. From the feed chamber there is clutch cooling flow through the clutch, apertured drum 87, the grooved plates and apertured drum 86, to the coupling inlet and bypass flow relative to the clutch plates through a restricted bypass passage having a restricted passage partion between, restricting flange 112 and piston 92, the passage or aperature is apply ring partion 114 and apertured drum 86, to the coupling inlet. The clutch cooling flow between the plates is high when the clutch is disengaged or slipping and the coupling is driving so there is a high clutch cooling flow and a low bypass flow to the couping for maximum supply and cooling to meet maximum requirements. When the clutch is engaged and the coupling deactivated, clutch cooling flow is reduced and bypass flow increased for a lower or minimum flow to meet minimum coupling cooling flow requirements. A coupling bypass passage extends from the coupling inlet radially inward between the hub and clutch and through a restriction 119 to the exhaust passage 116 to limit pressure and flow to the coupling to maximum requirements. The fluid in the clutch chamber, both the feed chamber portion and the bypass portion, acts as a release pressure on the piston.

In the description of the control system reference to the location of parts on the drawing by use of upper, lower, etc., is merely for convenience as it is known that the position of such valves in the transmission is not important. The above described embodiment is illustrative of the invention which may be used in modified form.

It is claimed:

1. In a transmission an input member adapted to be driven by an engine and having net input torque from a high idle speed low idle input torque, through a low idle speed high idle input torque to a maximum high input torque in a starting high input torque low input torque low input speed range and then reduced input torque in a large drive input speed range to maximum input speed; an intermediate member; a load output member driven from zero speed through a small starting output speed range from zero to a low output speed and a large drive output speed range from said low speed to maximum drive output speed and having load torque requirements from zero to maximum; a low capacity fluid drive means and a variable capacity slipping friction starting clutch means connected in parallel between said input member and said intermediate member; drive connecting means connected between said intermediate member and said load output member and having control means operative to selectively disestablish a drive between said intermediate member and said load member for said zero load torque requirements and establish a starting drive from said intermediate member to said load output member operative when said load output member is stationary to stall said fluid drive means; said fluid drive means having a low idle speed high idle torque capacity at zero speed ratio stall increasing at a greater rate with input member spaced than input member idle torque to reduce input member idle speed from said high idle speed and regulate said input member speed at said low idle speed and at normal drive torque high speed ratio drive substantially zero torque capacity in said starting high torque low input speed range and maximum torque capacity about equal to said low idle speed high torque capacity at maximum input speed; and said clutch means including clutch control means operative in response to manual control, when said drive connecting means establishes said starting drive and stalls said fluid drive means, for providing a progressively variable torque capacity from substantially zero torque to lock-up torque equal to the load output member torque requirements beginning substantially to stall at said low idle speed and completed in said starting high torque low input speed range of said input member and said small starting speed range of said load output member up to maximum clutch torque capacity about equal to said maximum high input torque and simultaneously progressively increasing fluid drive speed ratio from zero speed ratio stall to said high speed ratio drive and progressively reducing torque capacity from substantially said high idle torque capacity to zero torque capacity before lock-up for a starting drive of said load member from stall to a lock-up speed in said small starting speed range of said load output member and in said starting high torque low input speed range of said input member.

2. The invention defined in claim 1, and said fluid drive means having a ratio of torus outer diameter to toric section diameter greater than seven to 1 and a stall torque capacity equal to said low idle speed high idle input torque at said low idle speed and said stall torque capacity at said low idle speed increasing at a very low rate slightly greater than the rate of increase of said high idle input torque to regulate idle speed at said low idle speed for smooth starting drive.

3. The invention defined in claim 1 and said clutch control means controlling said clutch in said substantially zero torque capacity providing floating engagement to take up slack and establish rotary friction conditions prior to increasing torque capacity for a smooth starting drive.

4. The invention defined in claim 1, and said clutch control means initially engaging said clutch means at said fluid drive means stall torque capacities only slightly above said low idle speed high idle torque capacity and said fluid drive means being responsive to progressively increasing clutch capacity drive to conjointly substantially inversely progressively reduce the torque capacity of said fluid drive means to lock up said clutch means on meeting load torque requirements and reducing said fluid drive means torque capacity from low idle speed high idle torque capacity to zero torque capacity at input speeds not materially above said low idle speed for a smooth starting drive.

5. In a transmission: means including a housing providing a housing chamber and input drive means: an output member in said rotary housing: a fluid coupling within said housing chamber having an annular bladed pump member driven by said input drive means and an annular bladed turbine member cooperating with said bladed pump member to form a toric chamber portion within the radially outermost portion of said housing chamber for toroidal fluid coupling flow having an inlet port and an outlet port: a hub connecting said turbine member to said output member providing in said housing chamber a feed and clutch chambe portion connected to said inlet port: an exhaust passage connected from said outlet port: multiplate friction clutch means having an apertured outer drum located concentrically within said fluid coupling: an apertured inner drum located concentrically within said outer drum; annular clutch friction plates with alternate plates splined to said outer drum and intermediate plates splined to said inner drum: control means; fluid motor means operative on the supply by said control means of clutch apply fluid pressure to engage said clutch means to establish a drive between said input drive means and said hub; said feed and clutch chamber portion having a feed chamber portion radially within said inner drum and a clutch bypass chamber portion having restriction means providing restricted flow between said feed chamber portion and said inlet port limiting clutch bypass flow to said fluid coupling; coupling fluid supply means for supplying fluid to said feed chamber portion for clutch cooling flow to pass radially outward through said clutch means, said apertured inner drum, plates, apertured outer drum, to said coupling inlet port, to cool the clutch and supply operating fluid to the coupling, and said clutch bypass flow through said clutch bypass chamber portion to said coupling inlet port being inversely proportional to clutch cooling flow to supply both said clutch cooling flow and bypass flow to said coupling inlet port.

6. In a transmission: a rotary housing having input drive means and providing a housing chamber: an output member in said rotary housing: a fluid coupling within said rotary housing having an annular bladed pump member mounted on said rotary housing and an annular bladed turbine member cooperating with said blade pump member to form a toric chamber portion within the radially outermost portion of said housing chamber for toroidal fluid coupling flow having an inlet port and an outlet port: a hub connecting said turbine membe to said output member dividing said housing chamber into a feed and clutch chamber portion connected to said inlet port and an exhaust passage connected from said outlet port; multiplate friction clutch means having an apertured outer drum located concentrically within said fluid coupling; an apertured inner drum located concentrically within said outer drum; annular clutch friction plates with alternate plates splined to said outer drum and intermediate plates splined to said inner drum; control means fluid motor means operative on the supply of clutch apply fluid pressure by said control means to engage said clutch means to establish a drive between said rotary housing and said hub; said feed and clutch chamber portion having a feed chamber portion radially within said inner drum and a clutch bypass chamber portion having restriction means porviding restricted flow between said feed chamber portion and said inlet port limiting clutch bypass flow to said fluid coupling; coupling fluid supply means for supplying fluid to said feed chamber portion for clutch cooling flow to pass radially outward through said clutch means, said apertured inner drum, plates, apertured outer drum, to said coupling inlet port, to cool the clutch and supply operating fluid to the coupling, and said clutch bypass flow through said clutch bypass chamber portion to said coupling inlet port being inversely proportional to clutch cooling flow to supply both said clutch cooling flow and bypass flow to said coupling inlet port.

7. In a transmission: a rotary housing having input drive means and providing a housing chamber: an output member in said rotary housing: a fluid coupling within said rotary housing having an annular bladed pump member mounted on said rotary housing and an annular bladed turbine member cooperating with said bladed pump member to form a toric chamber portion within the radially outermost portion of said housing chamber for toroidal fluid coupling flow having an inlet port and an outlet port: a hub connecting said turbine member to said output member dividing said housing chamber into a feed and clutch chamber portion connected to said inlet port and an exhaust passage connected from said outlet port; multiplate friction clutch means having an apertured outer drum located concentrically within said fluid coupling; an apertured inner drum located concentrically within said outer drum; annular clutch friction plates with alternate plates splined to said outer drum and intermediate plates splined to said inner drum; control means, fluid motor means in said feed and clutch chamber portion having a cylinder on said housing and a piston operative on the supply of clutch apply fluid pressure by said control means to said cylinder to engage said clutch means to establish a drive between said rotary housing and said hub and the pressure in the feed and clutch chamber portion releasing said clutch means; said feed and clutch chamber portion having a feed chamber portion radially within said inner drum and a clutch bypass chamber portion having restriction means providing restricted flow between said feed chamber portion and said inlet port limiting clutch bypass flow to said fluid coupling to minimum coupling cooling flow requirements; coupling fluid supply means for supplying fluid to said feed chamber portion for clutch cooling flow to pass radially outward through said clutch means, said apertured inner drum, plates, apertured outer drum, to said coupling inlet port, to cool the clutch and supply operating fluid to the coupling having a high flow when the clutch is disengaged and in slipping engagement and the driving fluid coupling requires a high cooling flow and reduced flow when the clutch is in lock up engagement and the unloaded fluid coupling requires minimum cooling flow, and said clutch bypass flow through said clutch bypass chamber portion to said coupling inlet port being inversely proportional to clutch cooling flow to supply both said clutch cooling flow and bypass flow to said coupling inlet port to maintain minimum flow to the coupling; coupling bypass passage means connecting said coupling inlet port radially inward and through a restricted connection to said exhaust passage to limit coupling inlet pressure and flow to meet maximum coupling cooling requirements.

8. In a transmission: a rotary housing having a front wall; a rear wall secured to the front wall at the outer diameter; input means on the front wall: an output member within said rotary housing: a fluid coupling within said rotary housing having an annular bladed pump member mounted on said rear wall and an annular bladed turbine member cooperating the bladed pump member to form a toric chamber within the outermost portion of the housing for toroidal fluid coupling flow having an inner gap and an outer gap and having a seven to one or larger ratio of toric chamber outer diameter to toric chamber section diameter: a hub connecting the turbine member to the output member: a multiplate friction clutch having an outer drum having apertures, located concentrically within said fluid coupling and mounted on said rear wall; an inner drum having apertures, located concentrically within said outer drum and mounted on said hub; an abutment plate fixed on the front end of said outer drum; seal means being said abutment plate and said hub; a coupling inlet passage between the outer drum and the inlet gap; a cylinder chamber on the inside of said rear wall radially within said outer drum; a piston slidably mounted in the cylinder chamber; annular clutch friction plates between said abutment plate and piston with alternate plates splined to said outer drum and intermediate plates splined to said inner drum; a radial exhaust passage between the turbine member and hub on one side and the front wall on the other side; a clutch chamber radially within said outer drum between said rear wall and piston on one side and said abutment plate and hub on the other side having a feed chamber portion radially within said inner drum and a clutch bypass chamber portion between the plates and piston; clutch bypass flow restriction means between said inner drum and piston providing a flow restriction between the feed chamber portion and the bypass chamber portion limiting clutch bypass flow to the fluid coupling to minimum coupling cooling flow requirements, coupling fluid supply means for supplying fluid to said feed chamber portion for clutch cooling flow to pass radically outward through the apertures of the inner drum, the plates, apertures of the outer drum and coupling inlet passage, to cool the clutch and supply operating fluid to the coupling having a high flow when the clutch is disengaged and in slipping engagement and the driving fluid coupling requires a high cooling flow and reduced flow when the clutch is in lock up engagement and the unloaded fluid coupling requires minimum cooling flow, and the clutch bypass flow through the clutch bypass flow restriction, bypass chamber porton, apertures of the outer drum and coupling inlet passage, being inversely proportional to clutch cooling flow to maintain minimum flow to the coupling and the clutch cooling flow and bypass flow flowing from the coupling inlet passage through the inner gap, fluid coupling toric chamber, outer gap and exhaust passage to supply both clutch cooling flow and clutch bypass flow to the fluid coupling; coupling bypass passage means connecting the coupling inlet passage radially inward between the abutment plate and the hub to a restricted connection through the hub to exhaust passage to limit coupling inlet pressure and flow to meet maximum coupling cooling requirements, clutch apply and control means for supplying clutch apply pressure varying from the coupling fluid pressure value for clutch release to a high clutch apply pressure to the cylinder chamber to act on the piston to variably apply the clutch and said coupling supply fluid in the clutch chamber acting on the piston to release the clutch; a restricted passage between said cylinder chamber and said clutch bypass chamber to minimize differential pressure due to tolerance variations when the coupling pressure and the clutch apply pressure are regulated at the same value for clutch release.

9. In a transmission; an input member; an output member connected to a load; a fluid drive and an annular friction clutch having apply control means and connected in parallel between said input member and output member arranged in concentric relation with the friction clutch concentrically within the fluid drive with a fluid passage between the clutch and fluid drive; means to supply clutch cooling and fluid drive operating and cooling fluid centrally within said annular friction clutch; an exhaust; said clutch having means to receive said fluid for cooling the clutch and to transmit said fluid radially through said clutch to said passage for said fluid drive and said fluid drive having means to receive said fluid from said passage for operation and transmit said fluid for cooling to said exhaust.

10. The invention defined in claim 9 and bypass means connecting said passage to exhaust to limit pressure and flow through said fluid drive.

11. The invention defined in claim 9 and said apply control means including fluid motor means for applying said clutch and said fluid supply means providing a release pressure on said fluid motor means.

12. In a transmission; an input member for drive connecting to an engine and having net input torque from a high idle speed low idle torque through a low idle speed high idle torque to a maximum input torque in a starting high torque low input speed range including low idle speed and then reduced input torque in a large input drive speed range to maximum input speed; an intermediate member; a load output member; drive connecting means for selectively drive connecting and disconnecting said intermediate member to said load output member for drive from zero output speed through a small starting low load output speed range from zero output speed to a low output speed and a large drive load output speed range from said low output speed to maximum output speed with load torque requirements from zero to maximum load torque; a low capacity fluid drive means and friction starting clutch means having disengaged and slipping to lock-up engagement operation connected in parallel between said input member and said intermediate member for conjointly transmitting net input torque; said fluid drive means having a fluid drive torque capacity at normal drive torque maximum speed ratio which is substantially zero in said starting high torque low input speed range of said input member and at maximum input speed increases to a low torque capacity relative to said maximum drive torque and nearer said idle speed low torque at maximum speed and a low fluid drive stall torque capacity at zero speed ratio stall at said low idle speed of said input member equal to high idle input torque and increasing at a low rate greater than input member idle torque rate of change with speed to, when said clutch means is disengaged and said drive connecting means connecting said load output member at zero speed to said intermediate member to stall said fluid drive means, regulate said input member idle speed at said low idle speed; said friction clutch means having a torque capacity varying from substantially zero clutch torque capacity when disengaged and gradually progressively increasing clutch torque capacity during slipping engagement to lock up clutch torque capacity on meeting load torque requirements at lockup and then increasing to maximum clutch torque capacity to transmit said maximum input torque; and control means operatively connected to said friction clutch means operative in response to manual control, when said drive connecting means is connecting and said load output member is at zero speed to stall said fluid drive means, to initially engage at stall and gradually increase engagement to reduce slip and lock up said friction means to progressively increase said clutch torque capacity from said substantially zero torque capacity to said lock-up torque capacity beginning substantially at stall at said low idle input speed and being completed in said starting high torque low input speed range of said input member and said small starting low output speed range of said load output member and progressively increase fluid drive speed ratio from stall to said maximum speed ratio drive and reduce said fluid drive means torque capacity from substantially said high idle torque capacity at low idle speed progressively to zero in the same period as said friction clutch means progressively increases said clutch torque capacity from substantially zero to said lock-up torque capacity.

13. In a transmission; an input member for drive connecting to an engine and having net input torque from a high idle speed low idle torque through a low idle speed high idle torque to a maximum input torque in a starting high torque low input speed range including low idle speed and then reduced input torque in a large input drive speed range to maximum input speed; an intermediate member; a load output member; drive connecting means for disconnecting and for drive connecting said intermediate member to said load output member driven from zero speed through a small starting low speed range from zero to a low speed and a large drive speed range to maximum drive speed with load torque requirements from zero to maximum load torque; low capacity fluid drive means and friction starting clutch means having disengaged and slipping to lock-up engagement operation connected in parallel between said input member and said intermediate member for conjointly transmitting net input member drive torque; said fluid drive means having a fluid drive torque capacity at normal drive torque maximum speed ratio drive which is substantially zero in said high torque low input speed range and at higher speeds increases to a low torque capacity substantially less than said input member torque at said maximum input speed and a fluid drive low stall torque capacity increasing with said input member speed at a higher rate than the rate of change of input member idle torque with input member speed and equaling said net input member drive torque at said low idle speed to reduce input member idle speed from said high idle speed and regulate input member idle speed at said low idle input speed; said friction clutch means having a torque capacity varying from substantially zero clutch torque capacity when disengaged and gradually progressively increasing clutch torque capacity during said slipping engagement to said lock up clutch torque capacity on meeting load torque requirements at lock-up and then increasing to maximum torque capacity to transmit said maximum input torque of said input member; and control means operatively connected to said friction clutch means operative automatically in response to manual control, when said drive connecting means is connecting and said load member is at zero speed to stall said fluid drive means, to initially engage at stall when said fluid drive means has a low stall torque capacity not materially above said fluid drive low idle stall torque capacity and substantially at said low idle input speed to smooth the initial engagement, to gradually increase engagement to reduce slip to lock up said friction clutch means to increase said clutch torque capacity from said substantially zero torque capacity to said lock up torque capacity on meeting said load torque requirements in said starting high torque low input speed range and increasing said load output member speed within said small starting low speed range and to progressively increase fluid drive speed ratio from stall to said maximum speed ratio drive and reduce fluid drive torque capacity from substantially said low idle torque capacity to zero capacity conjointly as said friction clutch means progressively increases clutch torque capacity from substantially zero to lock up torque capacity.

* * * * *

# UNITED STATES PATENT OFFICE
CERTIFICATE OF CORRECTION

Patent No. 4,018,316      Dated April 19, 1977

Inventor(s) Ted M. McQuinn et al.

It is certified that error appears in the above-identified patent and that said Letters Patent are hereby corrected as shown below:

In the Abstract, line 23, "pressure of the as turbine" should read --pressure of the gas turbine--.

Column 11, line 63, "pressure of torque" should read --pressure or torque--.

Column 14, line 23 "E 212" should read --E 312--.

Column 16, line 11 "pressure proportional" should read --pressure increases proportional--; line 55, "valve is" should read --value is--.

Column 20, line 54 "to apply against!" should read --to apply the clutch against--.

Column 21, line 6 "increases the" should read --increases increasing the--; line 30 "The" should read --Then--; line 35, "powder" should read --power--; line 42, "383 and 394" should read --383 and 384--; line 48, "clutvh" should read --clutch--.

Column 22, line 26 "start" should read --start is--; line 64 "idle load" should read --idle torque load--.

Column 23, line 10 "an the" should read --and the--; line 47 "partion" should read --portion--; line 49 "is apply ring partion" should read --in applying ring portion --.

Column 24, line 10 "input torque low input speed range and then reduced input torque" should read --input speed range and then reduced input torque--; line 32 "member spaced" should read --member speed--.

UNITED STATES PATENT OFFICE
CERTIFICATE OF CORRECTION

Patent No. 4,018,316      Dated April 19, 1977

Inventor(s) Ted M. McQuinn et al.

It is certified that error appears in the above-identified patent and that said Letters Patent are hereby corrected as shown below:

Column 25, line 33, "chambe" should read --chamber--.
    Column 27, line 37 "means being" should read --means between--.
    Column 28, line 12 "exhaust" should read --the exhaust--.

Signed and Sealed this

Eleventh Day of October 1977

[SEAL]

*Attest:*

RUTH C. MASON      LUTRELLE F. PARKER
*Attesting Officer*      *Acting Commissioner of Patents and Trademarks*